(12) United States Patent
Nagasaka et al.

(10) Patent No.: US 12,679,175 B2
(45) Date of Patent: Jul. 14, 2026

(54) AIR-CONDITIONING REGISTER

(71) Applicant: TOYODA GOSEI CO., LTD., Kiyosu (JP)

(72) Inventors: Akane Nagasaka, Kiyosu (JP); Nobuhiro Terai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 370 days.

(21) Appl. No.: 18/505,780

(22) Filed: Nov. 9, 2023

(65) Prior Publication Data

US 2024/0166026 A1 May 23, 2024

(30) Foreign Application Priority Data

Nov. 17, 2022 (JP) ................................. 2022-183931
Sep. 29, 2023 (JP) ................................. 2023-169484

(51) Int. Cl.
*B60H 1/34* (2006.01)

(52) U.S. Cl.
CPC ................................. *B60H 1/3414* (2013.01)

(58) Field of Classification Search
CPC .. B60H 1/3428; B60H 1/3435; B60H 1/3442; B60H 1/3414
USPC ................................................. 454/152–155
See application file for complete search history.

(56) References Cited

U.S. PATENT DOCUMENTS

2016/0250909 A1* 9/2016 Schneider ............ B60H 1/3421
454/155
2019/0202271 A1* 7/2019 Brand .................. B60H 1/3428

FOREIGN PATENT DOCUMENTS

| CN | 210911942 U | 7/2020 |
| CN | 115139755 A | 10/2022 |
| EP | 3321114 A1 | 5/2018 |
| JP | H10-138750 A | 5/1998 |
| JP | 2006-206008 A | 8/2006 |
| JP | 2021-088262 A | 6/2021 |

OTHER PUBLICATIONS

Notice of Reasons for Refusal dated Jul. 15, 2025 issued in corresponding Japanese Patent Application No. JP2022-183931 (and English machine translation).

* cited by examiner

*Primary Examiner* — Vivek K Shirsat
(74) *Attorney, Agent, or Firm* — Posz Law Group, PLC

(57) ABSTRACT

An air-conditioning register includes: a retainer including a retainer inner wall and a retainer opening portion, and having a cylindrical shape, the retainer inner wall defining a retainer ventilation passage, the retainer opening portion being provided at a downstream end of the retainer ventilation passage; and a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion.

19 Claims, 21 Drawing Sheets

AIR-CONDITIONING REGISTER

CROSS REFERENCE TO RELATED APPLICATIONS

The present application claims priority to Japanese Patent Application No. 2022-183931 filed on Nov. 17, 2022, and Japanese Patent Application No. 2023-169484 filed on Sep. 29, 2023, the disclosures of which are incorporated herein by reference in their entirety.

BACKGROUND

Field

The present disclosure relates to an air-conditioning register.

Related Art

There is a known air-conditioning register in which horizontal blades and vertical blades are disposed at an opening portion on a front surface of a frame body in such a way as to intersect with each other, air supplied from a duct being blown from the opening portion, the horizontal blades being provided for adjusting the direction of air in the vertical direction, the vertical blades being provided for adjusting the direction of air in the lateral direction (for example, JP-H10-138750A). In this register, the plurality of horizontal blades are disposed in such a way as to be spaced apart from each other at equal intervals, and the plurality of vertical blades are disposed behind the horizontal blades in such a way as to be adjacent to the horizontal blades.

The conventional technique has a problem that structures disposed inside the register, such as the vertical blades located behind the horizontal blades, can be seen through gaps formed between the separated horizontal blades, so that design properties are impaired.

SUMMARY

According to one aspect of the present disclosure, an air-conditioning register is provided. This air-conditioning register includes: a retainer including a retainer inner wall and a retainer opening portion, and having a cylindrical shape, the retainer inner wall defining a retainer ventilation passage, the retainer opening portion being provided at a downstream end of the retainer ventilation passage; and a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion.

BRIEF DESCRIPTION OF THE DRAWINGS

FIG. 3 is an exploded perspective view showing configurations of respective parts of the air-conditioning register;

FIG. 5 is a cross-sectional view taken along V-V in FIG. 2;

FIG. 7 is an explanatory view showing a simulation result of flow velocity of an air flow from the air-conditioning register in the neutral state;

FIG. 9 is an explanatory view showing a simulation result of flow velocity of an air flow from the air-conditioning register in the first rotation state;

FIG. 10 is a perspective view showing a configuration of an air-conditioning register according to another embodiment;

FIG. 11 is a perspective view showing an external configuration of an air-conditioning register according to a second embodiment;

DETAILED DESCRIPTION

A. First Embodiment

Figure 1:
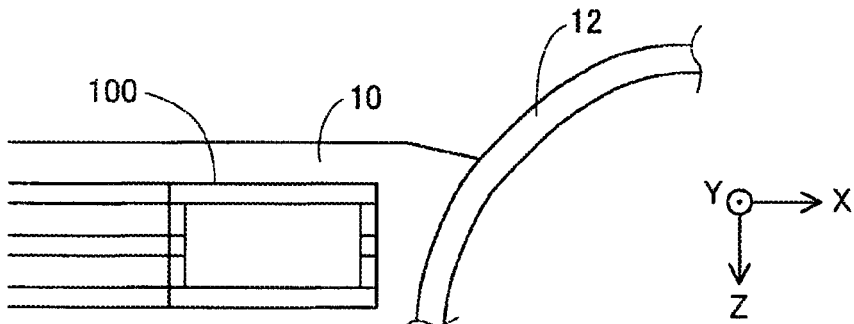
FIG. 1 is an explanatory view showing an example of installation of an air-conditioning register according to a first embodiment of the present disclosure.

FIG. 1 is an explanatory view showing an example of installation of an air-conditioning register 100 according to a first embodiment of the present disclosure. The air-conditioning register 100 is installed in a vehicle compartment of a mobile body, such as a vehicle, for example. In the example shown in FIG. 1, the air-conditioning register 100 is incorporated in an instrument panel 10 disposed in the vicinity of a steering wheel 12 of a vehicle, for example. The air-conditioning register 100 blows air-conditioning air into the vehicle compartment, the air-conditioning air being supplied through an air sending duct from an air conditioner not shown in the drawing provided to the vehicle. Symbols X, Y, Z shown in FIG. 1 and respective drawings following FIG. 1 indicate three spatial axes that are orthogonal to each other. In this specification, directions extending along these axes are also referred to as "X direction", "Y direction", and "Z direction". In the case of specifying directions, positive and negative symbols are additionally used to describe the directions, that is, "+" for a positive direction and "−" for a negative direction, and the description will be made assuming that the direction of an arrow in the respective drawings is the + direction and the opposite direction of the + direction is the − direction. In the present disclosure, the description will be made by taking, as an example, the case in which the X direction corresponds to the vehicle width direction, the +X direction corresponds to the right direction when the vehicle is viewed from the rear side, the −X direction corresponds to the left direction, the Y direction corresponds to the advancing direction of the vehicle, thus the +Y direction corresponds to the backward direction, and the −Y direction corresponds to the forward direction. The Z direction corresponds to the vertical direction, the +Z direction corresponds to the vertically downward direction, and the −Z direction corresponds to the vertically upward direction. However, the respective directions do not limit the direction along which the air-conditioning register 100 is disposed.

Figure 2:
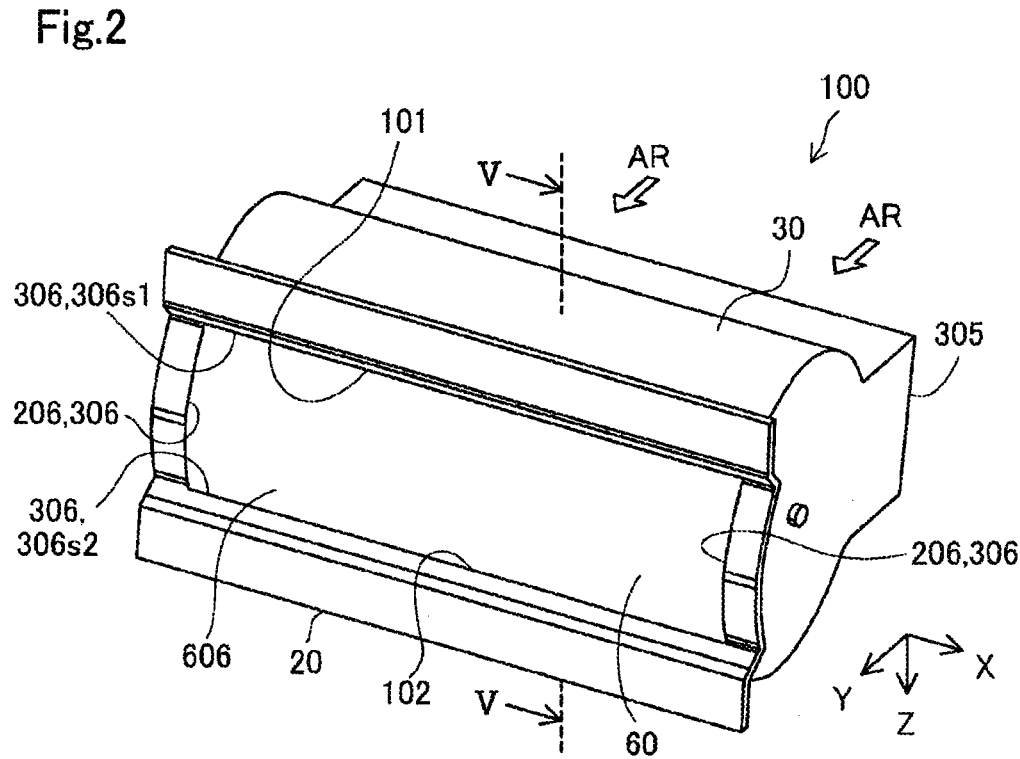
FIG. 2 is a perspective view showing an external configuration of the air-conditioning register.

FIG. 2 is a perspective view showing an external configuration of the air-conditioning register 100. As shown in FIG. 2, the air-conditioning register 100 includes a retainer 30, a bezel 20, a lid assembly 60, an exposed surface 606, a first air outlet 101, and a second air outlet 102.

Figure 3:
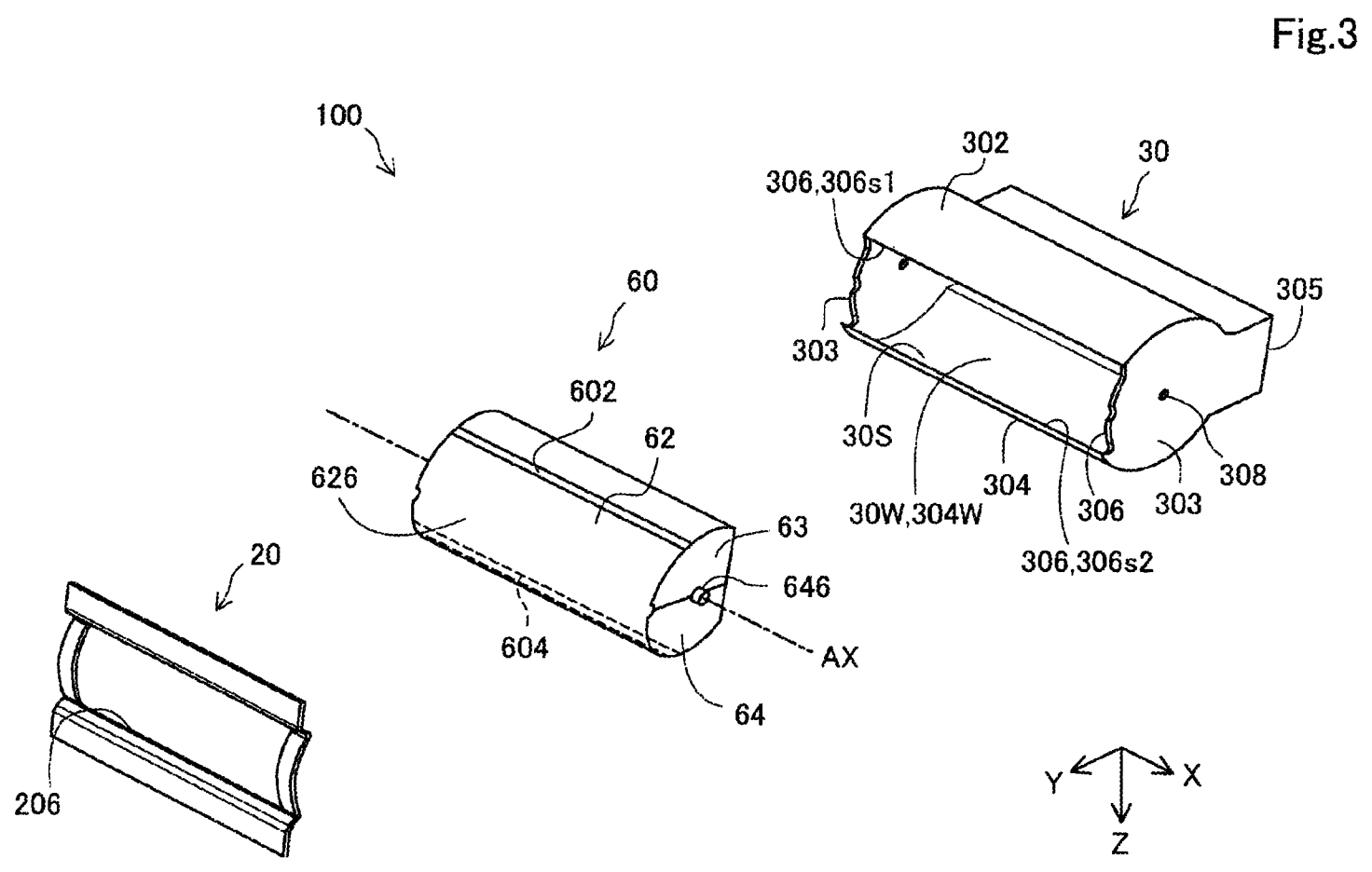

FIG. 3 is an exploded perspective view showing configurations of respective parts of the air-conditioning register 100. As shown in FIG. 3, the retainer 30 is a cylindrical structural body having a retainer ventilation passage 30S therein. The retainer 30 includes a first wall portion 302, a second wall portion 304, and side wall portions 303. The first wall portion 302 is a wall surface disposed on the upper side in the vertical direction, the first wall portion 302 forming the retainer 30. The second wall portion 304 is a wall surface disposed on the lower side in the vertical direction. The side wall portions 303 connect the first wall portion 302 and the second wall portion 304 to each other. As will be described later, the side wall portions 303 have fitting holes 308 that are fitted on protruding portions 646 provided to the lid assembly 60. The inner wall surfaces of the respective wall portions 302, 303, 304 are also collectively referred to as "retainer inner wall 30W". The retainer inner wall 30W defines the retainer ventilation passage 30S. The inner wall surface of the first wall portion 302 is also referred to as "first retainer inner wall 302W", and the inner wall surface of the second wall portion 304 is also referred to as "second retainer inner wall 304W".

As shown in FIG. 3, one end of the retainer 30 has a retainer opening portion 306, and the other end of the retainer 30 has an inflow port 305. The inflow port 305 receives air that is supplied from the air conditioner of the vehicle. The retainer opening portion 306 is located at the downstream end of the retainer ventilation passage 30S, and is disposed in such a way as to face the vehicle compartment. The retainer opening portion 306 communicates with the inflow port 305 via the retainer ventilation passage 30S. The retainer opening portion 306 has a substantially rectangular shape extending along the vehicle width direction. One of the long sides of the retainer opening portion 306 is also referred to as "first side 306s1", and the other of the long sides of the retainer opening portion 306 is also referred to as "second side 306s2". In the present embodiment, the first side 306s1 is disposed on the upper side in the vertical direction, and is continuously formed with the first retainer inner wall 302W of the retainer inner wall 30W. The second side 306s2 is disposed on the lower side in the vertical direction in such a way as to face the first side 306s1. The second side 306s2 is continuously formed with the second retainer inner wall 304W of the retainer inner wall 30W.

As shown in FIG. 2, in the state in which the lid assembly 60, which will be described later, is housed in the retainer 30, the first air outlet 101 is formed between the first side 306s1 and the lid assembly 60 and the second air outlet 102 is formed between the second side 306s2 and the lid assembly 60, the first air outlet 101 having a slit shape extending along the first side 306s1, the second air outlet 102 having a slit shape extending along the second side 306s2. As shown by an arrow AR in FIG. 2, air-conditioning air supplied from the air conditioner not shown in the drawing flows into the retainer ventilation passage 30S from the inflow port 305, and is then blown into the vehicle compartment from the first air outlet 101 and the second air outlet 102 through a first retainer ventilation passage 612 and a second retainer ventilation passage 614. In the present disclosure, in the direction along which air-conditioning air flows, a position closer to the air conditioner than a predetermined reference position may also be referred to as "upstream position" or "upstream side", and a position farther from the air conditioner than the predetermined reference position may also be referred to as "downstream position", "downstream side", "front surface", or "front surface side".

The lid assembly 60 is a hollow structure through which air-conditioning air can flow. As shown in FIG. 3, the lid assembly 60 has a first slit 602 and a second slit 604, the first slit 602 communicating with the first air outlet 101, the second slit 604 communicating with the second air outlet 102. The lid assembly 60 has a substantially columnar external shape, and is disposed in the retainer ventilation passage 30S such that the axial direction of the lid assembly 60 is aligned with the vehicle width direction. More specifically, the lid assembly 60 is disposed in the retainer ventilation passage 30S at a position in the vicinity of the retainer opening portion 306 in such a way as to cover the retainer opening portion 306 from the inside of the retainer 30. A configuration is adopted in which the retainer opening portion 306 is covered by the lid assembly 60, thus preventing the internal structure of the air-conditioning register 100 from being visually perceived from the outside. The description "the lid assembly 60 covers the retainer opening portion 306" refers to the fact that the lid assembly 60 covers the retainer opening portion 306 to an extent that the internal structure of the air-conditioning register 100 is prevented from being visually perceived from the outside, and allows flow passages for air-conditioning air, such as the first air outlet 101 and the second air outlet 102, to be formed between the lid assembly 60 and the retainer opening portion 306.

The exposed surface 606 is a portion of the lid assembly 60 that is exposed from the retainer opening portion 306. Decoration may be applied to the exposed surface 606 in order to enhance design properties, for example. The term "decoration" refers to the act of adding a decorative element. Examples of decoration include painting, plating, printing, coloring, surface treatment, surface processing, and application of a decorative member or a functional member. Decoration may be applied at the time of manufacturing the air-conditioning register 100, or may be applied by the user of the vehicle or the air-conditioning register 100.

The bezel 20 is a frame body in which a bezel opening portion 206 is formed. The bezel opening portion 206 has a rectangular shape extending along the vehicle width direction. In the present embodiment, the bezel opening portion 206 is formed to have a shape substantially equal to the shape of the retainer opening portion 306. The bezel 20 is connected to the downstream end of the retainer 30 such that the bezel opening portion 206 overlaps with the retainer opening portion 306, and the exposed surface 606 is exposed from the bezel opening portion 206. With such a configuration, the bezel 20 forms a design surface together with the exposed surface 606 when the air-conditioning register 100 is viewed in a front view.

Figure 4:
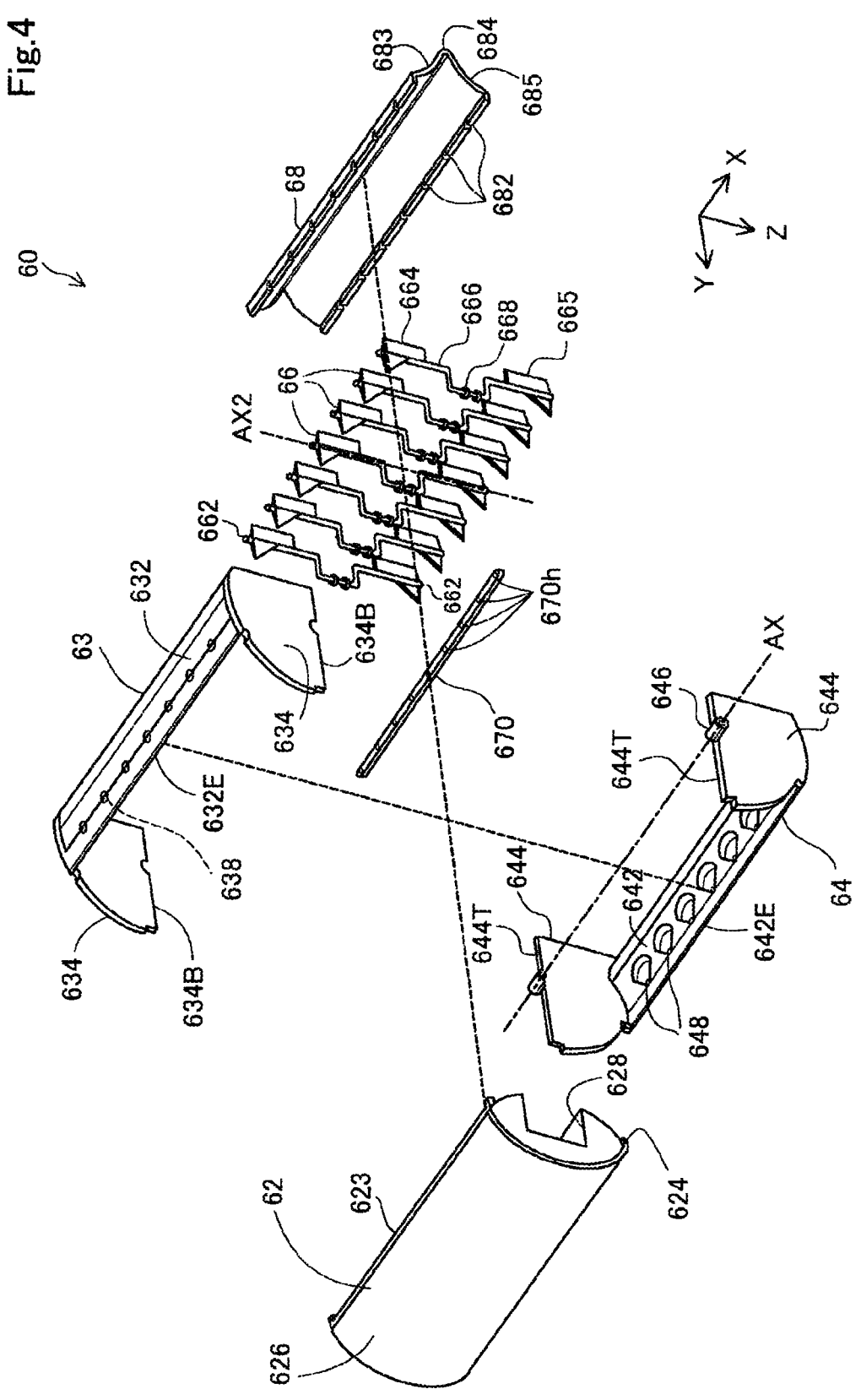
FIG. 4 is an exploded perspective view showing configurations of respective parts of a lid assembly.

FIG. 4 is an exploded perspective view showing configurations of respective parts of the lid assembly 60. As shown in FIG. 4, the lid assembly 60 is formed by assembling a front wall portion 62, an upper wall portion 63, a lower wall portion 64, a plurality of fins 66, a synchronization portion 670, and a flow dividing portion 68 into a unit.

The front wall portion 62 serves as the wall surface of the lid assembly 60 on the front side. The front wall portion 62 includes a front surface 626 and a shaft fitting portion 628. The shaft fitting portion 628 is provided on the back surface of the lid assembly 60, which is disposed on the side opposite to the front surface 626, and the flow dividing portion 68 is fitted in the shaft fitting portion 628. The front surface 626 is a curved surface that protrudes toward the outside of the air-conditioning register 100. The front surface 626 has an end side 623 having a straight line shape and an end side 624 having a straight line shape, the end side 623 being located at the upper end of the front surface 626, the end side 624 being located at the lower end of the front surface 626. A portion of the front surface 626 is exposed from the retainer opening portion 306, and remaining portions of the front surface 626 face the retainer inner wall 30W. The portion of the front surface 626 that is exposed from the retainer opening portion 306 serves as the exposed surface 606. The portions of the lid assembly 60 that face the retainer inner wall 30W is also referred to as "retainer facing surface".

The upper wall portion 63 serves as the wall surface of the lid assembly 60 on the upper side. The upper wall portion 63 includes an upper surface portion 632 and two side wall portions 634, which are continuously formed with both ends of the upper surface portion 632. The upper surface portion 632 has fitting holes 638 the number of which is equal to the number of fins 66, protruding portions 662 provided to the fins 66 being fitted in the fitting holes 638. An end side 632E having a straight line shape is formed on the front surface side of the upper surface portion 632. When the lid assembly 60 is formed, the end side 632E is spaced apart from and faces the end side 623 of the front wall portion 62. With such a configuration, the first slit 602 shown in FIG. 3 is formed between the end side 632E and the end side 623.

The lower wall portion 64 serves as the wall surface of the lid assembly 60 on the lower side. The lower wall portion 64 includes a lower surface portion 642 and two side wall portions 644, which are continuously formed with both ends of the lower surface portion 642. The lower wall portion 64 has fitting holes 648 the number of which is equal to the number of fins 66, the protruding portions 662 provided to the fins 66 being fitted in the fitting holes 648. An end side 642E having a straight line shape is formed on the front surface side of the lower surface portion 642. When the lid assembly 60 is formed, the end side 642E is spaced apart from and faces the end side 624 of the front wall portion 62. With such a configuration, the second slit 604 shown in FIG. 3 is formed between the end side 642E and the end side 624.

An upper end 644T of each of the two side wall portions 644 is joined with a lower end 634B of each side wall portion 634 of the upper wall portion 63. The protruding portion 646 is formed at each upper end 644T, and protrudes toward the outside of the lid assembly 60. The protruding portions 646 have a substantially columnar shape, and fit in the fitting holes 308 formed in the side wall portions 303 of the retainer 30. With such a configuration, the lid assembly 60 is supported in the retainer ventilation passage 30S in such a way as to be rotatable about a center axis AX.

The fins 66 laterally change the direction of air flows that are blown from the first air outlet 101 and the second air outlet 102 along the vehicle width direction. The fins 66 are housed in the lid assembly 60. Each fin 66 includes the protruding portions 662, a first fin 664, a second fin 665, a shaft portion 666, and a synchronous coupling portion 668. The protruding portions 646 may be formed by a shaft member disposed in a space SP in the lid assembly 60 in a state of being inserted through the lid assembly 60 from one side wall portion 644 to the other side wall portion 644. In this case, the shaft member serves as a function part that allows the flow dividing portion 68 to be changeable between a first flow division state and a second flow division state. By using the shaft member, it is possible to increase durability compared with the case in which the protruding portions 646 are used, and it is also possible to reduce the region in which the space SP is occupied by the rotary shaft of the flow dividing portion 68.

The first fin 664 and the second fin 665 are substantially flat plate like members each having an outer diameter shape that conforms to the shapes of the flow passages formed in the lid assembly 60. The first fin 664 and the second fin 665 are configured such that the surfaces of the first fin 664 and the second fin 665 can rotate about a center axis AX2, being the axial direction of the shaft portion 666. With such a configuration, the first fins 664 can adjust the direction of an air flow flowing through the first retainer ventilation passage 612, and the second fins 665 can adjust the direction of an air flow flowing through the second retainer ventilation passage 614. Each shaft portion 666 is a shaft body having a rod shape. In the present embodiment, the first fin 664 and the second fin 665 are integrally formed with one shaft portion 666, thus being coupled to each other. Therefore, the shaft portion 666 serves as a fin coupling portion that couples the first fin 664 to the second fin 665. The first fin 664 and the second fin 665 share the center axis AX2. The first fin 664 and the second fin 665 may be formed as separate bodies, and center axes may be individually set for the first fin 664 and the second fin 665.

The protruding portions 662 are disposed at upper and lower distal ends of each shaft portion 666. The protruding portions 662 have a substantially columnar shape, and fit in the fitting holes 638 of the upper wall portion 63 and in the fitting holes 648 of the lower wall portion 64. With such a configuration, each fin 66 is supported in the lid assembly 60 in such a way as to be rotatable about the center axis AX2 of the shaft portion 666. In the present embodiment, the center axis AX2 is aligned with the vertical direction. However, the center axis AX2 is not limited to the vertical direction, and may be any direction that intersects with the first retainer inner wall 302W and the second retainer inner wall 304W.

The synchronization portion 670 is a member extending along the direction in which the plurality of fins 66 are arranged. The synchronization portion 670 has insertion holes 670h through which the shaft portions 666 are inserted. The synchronization portion 670 allows the shaft portions 666 to be inserted through the insertion holes 670h, thus coupling the shaft portions 666 of the plurality of fins 66 to each other. As a result, the synchronization portion 670 serves as a so-called link mechanism that causes the shaft portions 666 of the plurality of fins 66 to rotate in a synchronized manner.

The synchronous coupling portion 668 is a portion of the shaft portion 666 that is coupled to the synchronization portion 670. The synchronous coupling portion 668 is formed by bending the shaft portion 666, thus being provided at a position away from the center axis AX2. For example, when a lever not shown in the drawing and provided outside the air-conditioning register 100 is operated, the synchronization portion 670 is moved reciprocally along the vehicle width direction, so that the synchronous coupling portions 668 are moved along the vehicle width direction. The reciprocal movement of the synchronous coupling portions 668 is transferred to the shaft portions 666, so that the shaft portions 666 rotate about the center axes AX2. The rotation of the shaft portions 666 changes the direction of the surfaces of the first fins 664 and the second fins 665. As a result, the flow direction of air in the lid assembly 60 is laterally changed along the vehicle width direction. The shaft portion 666 is not limited to a shaft body having a rod shape, and may be a plate-like member substantially equal to a plate-like member used for the first fin 664 or the second fin 665.

As shown in FIG. 4, the flow dividing portion 68 is a shaft member extending along the vehicle width direction. The flow dividing portion 68 divides the flow passage in the lid assembly 60 into two directions. The flow dividing portion 68 includes support recessed portions 682 and a protruding portion 684, the support recessed portions 682 being provided for rotatably supporting the shaft portions 666 of the fins 66. The flow dividing portion 68 is assembled to the shaft fitting portion 628 of the front wall portion 62 with the shaft portions 666 inserted through the support recessed portions 682.

The flow dividing portion 68 has two inclined surfaces consisting of a first inclined surface 683 and a second inclined surface 685 that are connected to each other by using the protruding portion 684 as an apex. The protruding portion 684 is disposed on the upstream side of the retainer ventilation passage 30S. As a result, the flow dividing portion 68 is disposed in the retainer ventilation passage 30S in a state of protruding toward the inflow port 305. By causing the flow dividing portion 68 to have a shape that protrudes in one direction, it is possible to vertically divide the flow passage while suppressing an increase in flow passage resistance. The cross sectional shape of the flow dividing portion 68 is not limited to a triangular shape, and may be any of various shapes including a flat plate shape, a circular shape, an elliptical shape, and a polygonal shape, such as a quadrangular shape, a hexagonal shape, and an octagonal shape. In the case in which air-conditioning air is individually supplied to the first air outlet 101 and the second air outlet 102, such as a case in which the retainer ventilation passage 30S has two flow passages that individually correspond to the first air outlet 101 and the second air outlet 102, the flow dividing portion 68 may be omitted. In contrast, in the air-conditioning register 100 of the present embodiment, the flow dividing portion 68 is provided and hence, it is possible to divide the flow passage into a flow passage for the first air outlet 101 and a flow passage for the second air outlet 102 with a simple configuration without providing a complicated flow passage to the retainer ventilation passage 30S.

The air-conditioning register 100 includes a functional member that includes at least either one of the function part or an operation part, the function part being configured to vary the function of the air-conditioning register 100, the operation part being provided to operate a device provided to a vehicle 80. In the present embodiment, the air-conditioning register 100 includes the fins 66 and the lid assembly 60 as the functional member. Specifically, the fins 66 are one example of the function part that changes the direction of an air flow as a function of the air-conditioning register 100. As will be described later, the lid assembly 60 is one example of the function part that can change the direction of air blown from the air-conditioning register 100 when the direction of the lid assembly 60 is adjusted. A fixture or an attaching fixture that is provided only to form the air-conditioning register 100 or a part of the air-conditioning register 100, for example, is not considered to be the function part, so that the retainer 30, the bezel 20, and the housing, for example, are not considered to be the function part. When the operation part is operated by the occupant in the vehicle compartment, the operation part achieves the operation of a device provided to the vehicle 80, such as an air conditioner not shown in the drawing or the air-conditioning register 100. Examples of the operation part include an operation panel, a liquid crystal panel, or a switch provided to operate devices, such as the air conditioner not shown in the drawing and the air-conditioning register 100, and include a lever provided to change the direction of air-conditioning air blown from the air-conditioning register 100. Note that the operation part is not provided to the air-conditioning register 100 of the present embodiment. That is, the functional member does not necessarily include both the function part and the operation part, and may include only either one of the function part or the operation part.

Figure 5:
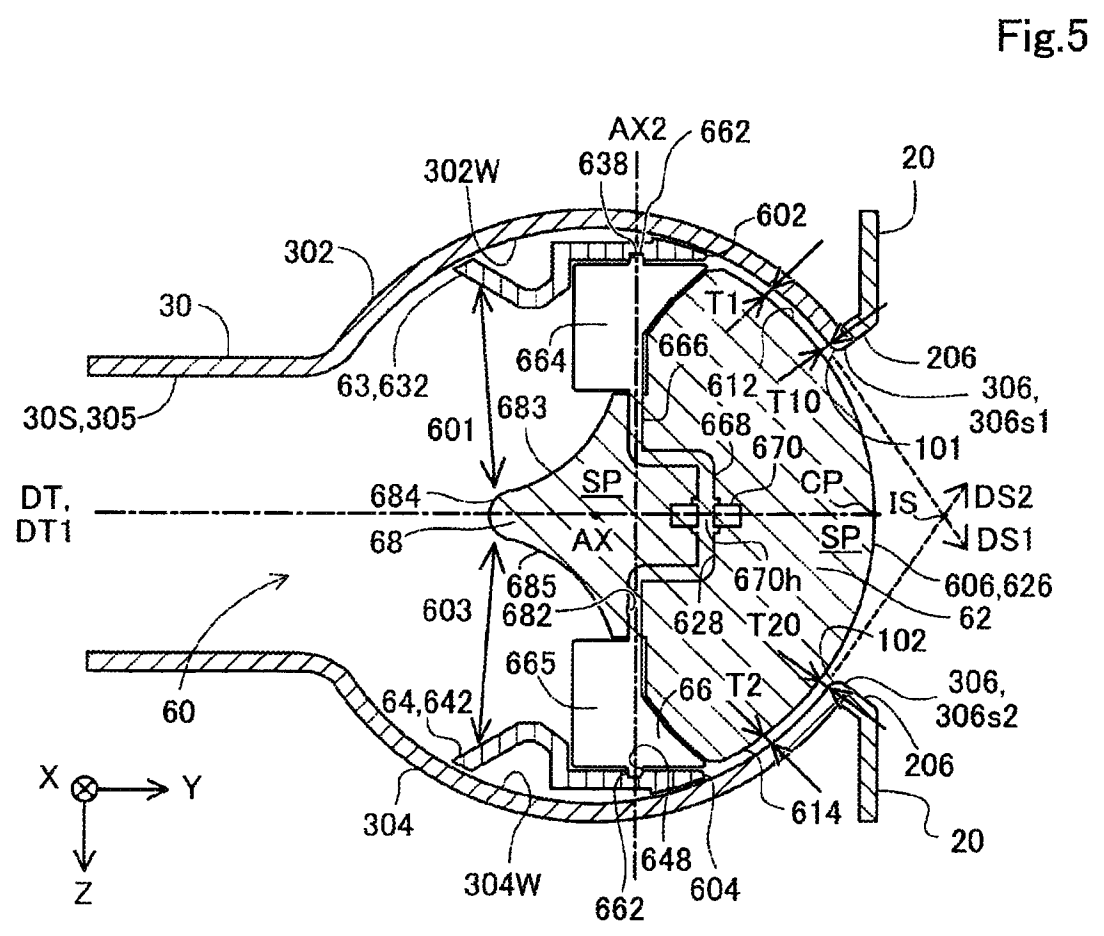

FIG. 5 is a cross-sectional view taken along V-V in FIG. 2. FIG. 5 shows the air-conditioning register 100 in a neutral state. The term "neutral state" refers to a state of the internal structure of the air-conditioning register 100 in which the flow rate of air blown from the first air outlet 101 is substantially equal to the flow rate of air blown from the second air outlet 102. In the present embodiment, as will be described later, the internal structure of the air-conditioning register 100 can be changed by adjusting the direction of the lid assembly 60 by rotating the lid assembly 60. To facilitate understanding of the technique, cross-sectional structures of the front wall portion 62 and the flow dividing portion 68 are shown in a simplified manner in FIG. 5 and in FIG. 6 and FIG. 8, which will be described later.

As shown in FIG. 5, in the present embodiment, the neutral state is established when the internal structure of the air-conditioning register 100 is brought into a so-called mirror symmetry in which the internal structure of the air-conditioning register 100 is vertically line symmetric with respect to the Y direction including the center axis AX. In the neutral state, the direction of the lid assembly 60 is a direction DT1 that is substantially aligned with the Y direction. The description "direction of the lid assembly 60" can be defined by a straight line DT that connects the center axis AX and a center point CP on the front surface 626 of the lid assembly 60, for example. The description "the center point CP on the front surface 626" can be defined by using a position on the front surface 626 at which a linear distance from the center point CP to the end side 623 is substantially equal to a linear distance from the center point CP to the end side 624, for example.

As shown in FIG. 5, the flow passages are formed in and around the lid assembly 60 in order to guide air-conditioning air, which flows into the lid assembly 60 from the inflow port 305, to the first air outlet 101 and the second air outlet 102. Specifically, a first inner flow passage 601 and a second inner flow passage 603 are formed in the lid assembly 60, the first inner flow passage 601 being formed between the first inclined surface 683 of the flow dividing portion 68 and the upper surface portion 632, the second inner flow passage 603 being formed between the second inclined surface 685 and the lower surface portion 642. The first inner flow passage 601 communicates with the first slit 602, and the second inner flow passage 603 communicates with the second slit 604. A first retainer ventilation passage 612 and a second retainer ventilation passage 614 are formed outside the lid assembly 60. The first retainer ventilation passage 612 is a flow passage defined between the first retainer inner wall 302W and the front surface 626 of the lid assembly 60, and the second retainer ventilation passage 614 is a flow passage defined between the second retainer inner wall 304W and the front surface 626. The first retainer ventilation passage 612 makes the first slit 602 communicate with the first air outlet 101, and the second retainer ventilation passage 614 makes the second slit 604 communicate with the second air outlet 102.

As shown in FIG. 5, in the present embodiment, the cross sectional shape of the first retainer inner wall 302W and the second retainer inner wall 304W is a substantially arc shape that corresponds to the cross sectional shape of the lid assembly 60. With such a configuration, the flow passages formed in and around the lid assembly 60 have the following features (1) to (3).

(1) A configuration is adopted in which a first distance T10 between the first side 306s1 and the front surface 626 at the first air outlet 101 is set to be substantially equal to a second distance T20 between the second side 306s2 and the front surface 626 at the second air outlet 102. That is, the opening width of the first air outlet 101 is substantially equal to the opening width of the second air outlet 102.

From the viewpoint of obtaining a good balance between design properties of the air-conditioning register 100 and the flow rate of air blown from the first air outlet 101, it is preferable to set the first distance T10 at the first air outlet 101 to 1 millimeter or more and 10 millimeters or less. When the first distance T10 is larger than 10 mm, for example, the first air outlet 101 is easily visually perceived and hence, there is a concern about a decrease in design properties of the air-conditioning register 100. When the first distance T10 is less than 1 mm, flow passage resistance is excessively increased, so that there is a concern that air-conditioning air at a general flow rate and a general flow velocity cannot provide a sufficient flow rate at the first air outlet 101. To obtain a better balance between design properties and the flow rate of air, it is more preferable to set the first distance T10 to 3 millimeters or more and 9 millimeters or less.

(2) A first ventilation passage distance T1 between the first retainer inner wall 302W and the front surface 626 is set to a substantially fixed value throughout the entire first retainer ventilation passage 612. A second ventilation passage distance T2 between the second retainer inner wall 304W and the front surface 626 is also set to a substantially fixed value throughout the entire second retainer ventilation passage 614. Such a configuration allows a configuration in which, even when the lid assembly 60 is rotated, the first ventilation passage distance T1 and the second ventilation passage distance T2 do not change.

(3) A configuration is adopted in which the first ventilation passage distance T1 is substantially equal to the second ventilation passage distance T2. That is, the flow passage height of the first retainer ventilation passage 612 is substantially equal to the flow passage height of the second retainer ventilation passage 614.

The flow passages formed in and around the lid assembly 60 have the above-mentioned features (1) to (3) and hence, it is possible to easily adjust a balance of flow rate, flow velocity, and other variables between air blown from the first air outlet 101 and air blown from the second air outlet 102.

FIG. 5 schematically shows a blowing direction DS1 of air blown from the first air outlet 101 and a blowing direction DS2 of air blown from the second air outlet 102. The description "blowing direction of air" refers to a macroscopic flow direction of air at the position of the air outlet. The blowing direction DS1 of air can be defined by using, for example, the tangent to a position of the first side 306s1 of the first retainer inner wall 302W in cross section or the tangent to the surface of the lid assembly 60 that faces the position of the first side 306s1 in cross section. The blowing direction DS2 can be defined by the tangent to a position of the second side 306s2 of the second retainer inner wall 304W or the tangent to the surface of the lid assembly 60 that faces the position. In the present embodiment, a configuration is adopted in which the blowing direction DS1 intersects with the blowing direction DS2 at an intersection IS shown in FIG. 5. Such a configuration allows a configuration in which air blown from the first air outlet 101 merges with air blown from the second air outlet 102, in the vicinity of the front surface 626.

As shown in FIG. 5, at least a portion of the functional member of the air-conditioning register 100 is disposed in the space SP defined between the first retainer ventilation passage 612 and the second retainer ventilation passage 614. In the present embodiment, the space SP is a space enclosed by the front wall portion 62 and the flow dividing portion 68. In the case in which a member having an internal space is provided between the first retainer ventilation passage 612 and the second retainer ventilation passage 614 as in the case of the lid assembly 60 or the like shown in FIG. 5, for example, the space SP may be defined by the outer shape of the member having the internal space. To facilitate understanding of the technique, an area corresponding to the space SP is hatched in FIG. 5. The shaft portions 666, being portions of the fins 66, and the synchronization portion 670 are disposed in the space SP. As described above, the function part that can vary the function of the air-conditioning register 100 is disposed in the space SP defined between the plurality of flow passages and hence, it is possible to effectively use the space SP. In the present embodiment, the function part is disposed in the space SP and hence, it is possible to achieve a reduction in size of the air-conditioning register 100.

Figure 6:
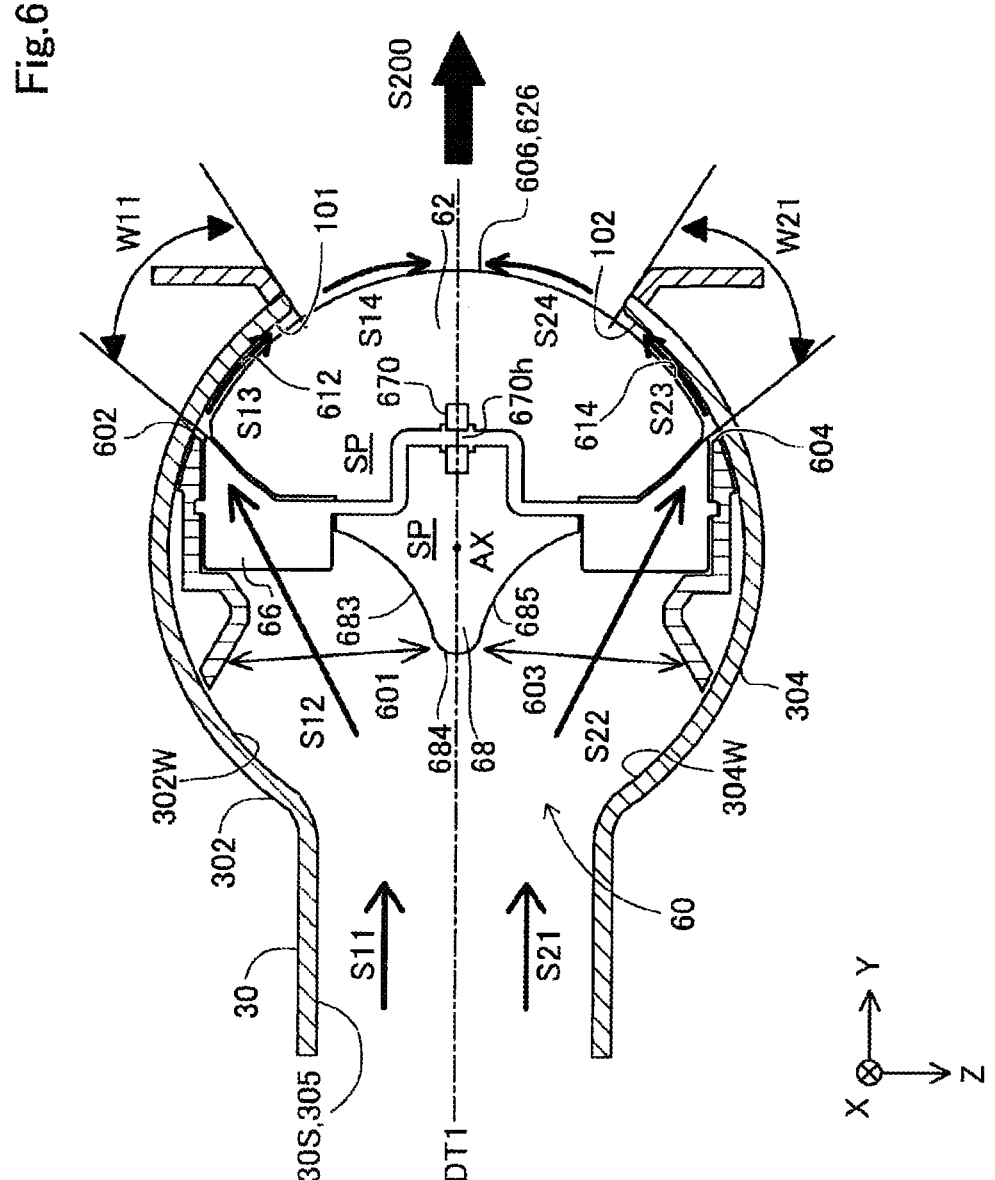
FIG. 6 is an explanatory view showing flow directions of air-conditioning air in the air-conditioning register in a neutral state.
Figure 7:
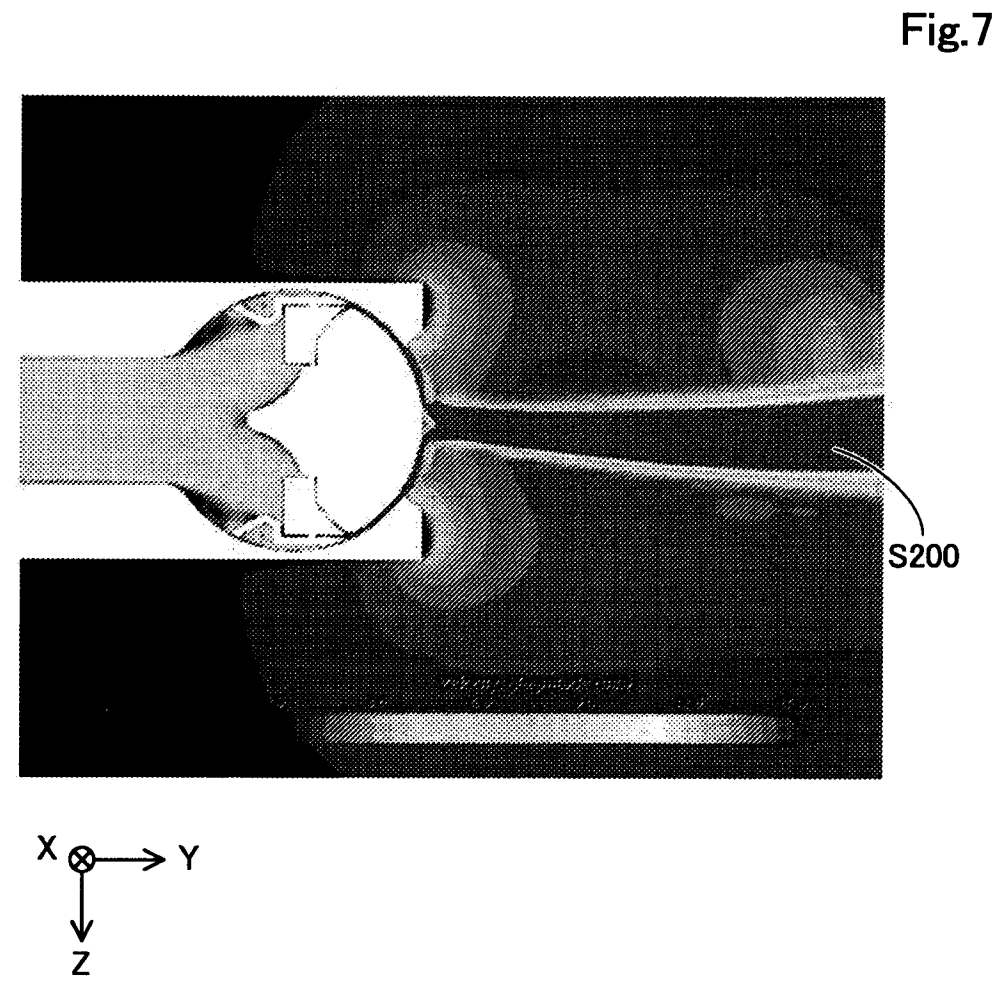

FIG. 6 is an explanatory view schematically showing flow directions of air-conditioning air in the air-conditioning register 100 in the neutral state. FIG. 7 is an explanatory view showing a simulation result of flow velocity of an air flow from the air-conditioning register 100 in the neutral state. When air from the air conditioner is supplied to the air-conditioning register 100, as shown by arrows S11, S21 in FIG. 6, air-conditioning air that flows into the retainer ventilation passage 30S from the inflow port 305 flows to the protruding portion 684 of the flow dividing portion 68. Then, as shown by arrows S12, S22, the air-conditioning air is divided by the protruding portion 684 into air for the first inner flow passage 601 and air for the second inner flow passage 603. By rotating the shaft portions 666 due to the operation of the fins 66 in order to change the direction of the surfaces of the first fins 664 and the second fins 665, it is possible to laterally change the flow direction of divided air, shown by the arrows S12, S22, along the vehicle width direction.

Air flowing through the first inner flow passage 601 is sent to the outside of the lid assembly 60 from the first slit 602 and, as shown by an arrow S13, flows through the first retainer ventilation passage 612. In the same manner, air flowing through the second inner flow passage 603 is sent to the outside of the lid assembly 60 from the second slit 604 and, as shown by an arrow S23, flows through the second retainer ventilation passage 614.

The air-conditioning register 100 of the present embodiment is configured such that, as shown in FIG. 6, a first facing area is substantially equal to a second facing area in the neutral state. The term "first facing area" refers to an area of a region in which the first retainer inner wall 302W faces the front surface 626 of the lid assembly 60. The term "second facing area" refers to an area of a region in which the second retainer inner wall 304W faces the front surface 626. In other words, a configuration is adopted in which, when the air-conditioning register 100 is in the neutral state, a flow passage length W11 of the first retainer ventilation passage 612 is substantially equal to a flow passage length W21 of the second retainer ventilation passage 614. Further, by forming the air-conditioning register 100 in such a way as to have the above-described features (1) to (3) in combination, the air-conditioning register 100 is configured such that, in the neutral state, the flow passage resistance of the first retainer ventilation passage 612 is substantially equal to the flow passage resistance of the second retainer ventilation passage 614. As a result, in the neutral state, it is possible to set, for example, the flow rate of air blown from the first air outlet 101 to be substantially equal to the flow rate of air blown from the second air outlet 102.

As shown by arrows S14, S24, air blown to the outside of the retainer 30 from the first air outlet 101 and air blown to the outside of the retainer 30 from the second air outlet 102 flow on the front surface 626 due to the Coanda effect, and then merge with each other on the front surface 626 or at a position separated from the front surface 626 due to separation. As shown in FIG. 6 and FIG. 7, after air from the first air outlet 101 and air from the second air outlet 102 that have substantially the same flow rate, for example, merge, the air flows toward the front side of the air-conditioning register 100 along the substantially horizontal direction as shown by an arrow S200.

Figure 8:
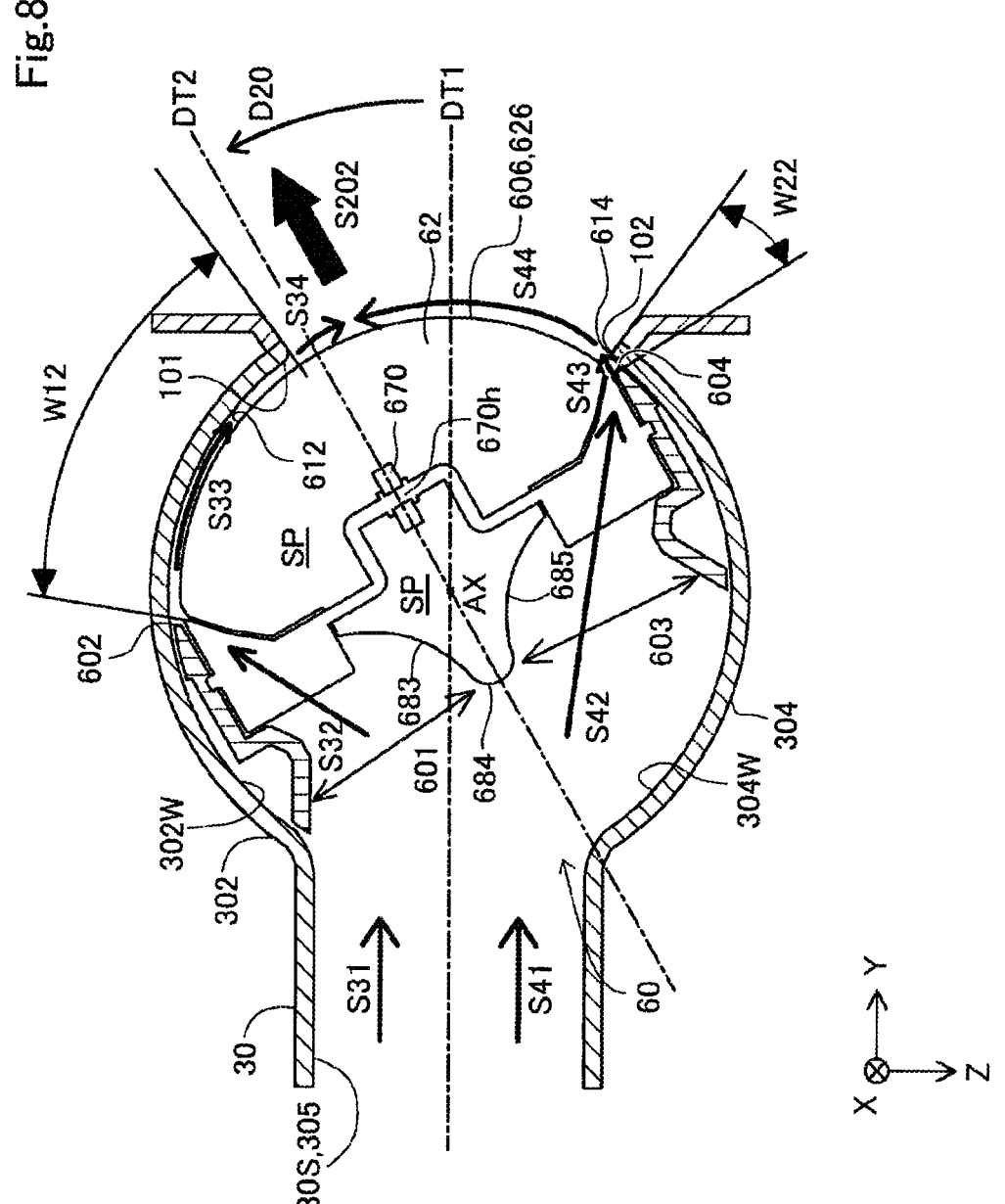
FIG. 8 is an explanatory view schematically showing flow directions of air in the air-conditioning register in a first rotation state.
Figure 9:
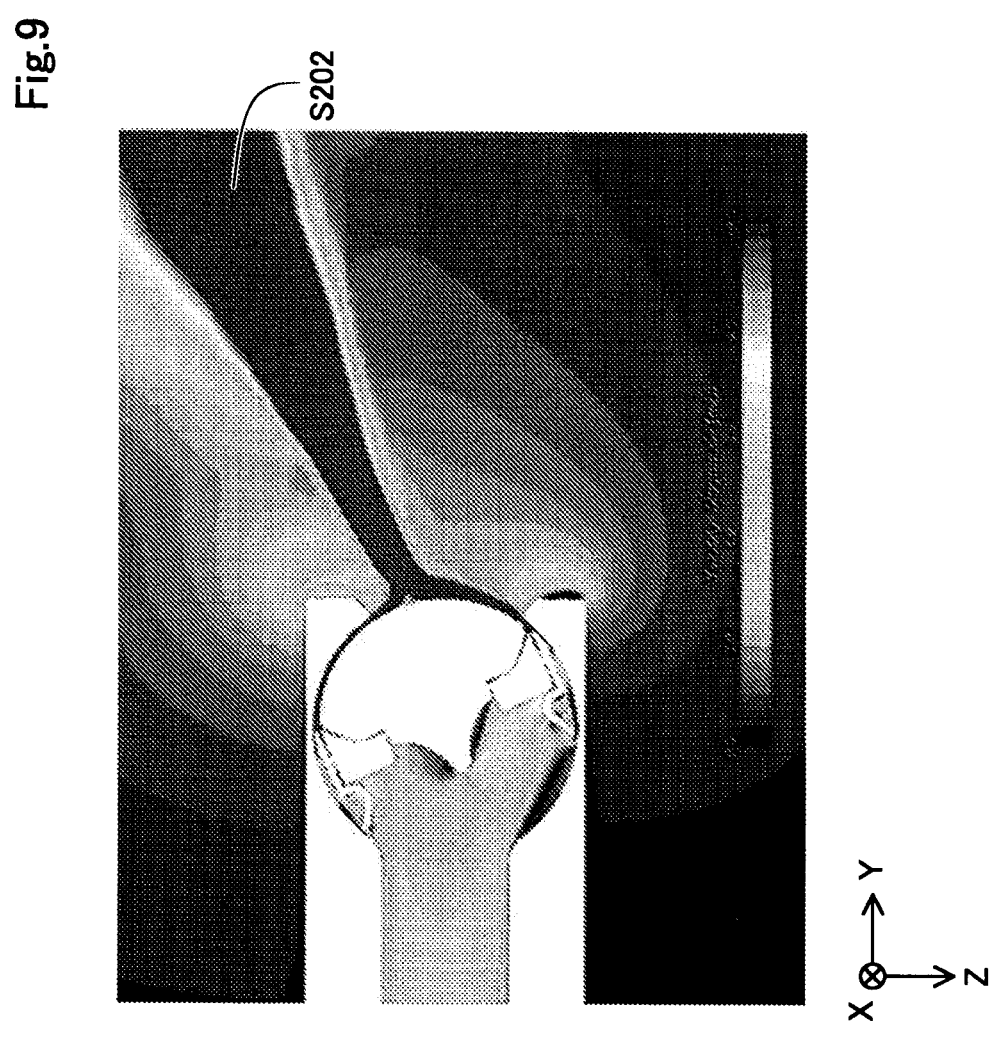

FIG. 8 is an explanatory view schematically showing flow directions of air-conditioning air in the air-conditioning register 100 in a first rotation state. FIG. 9 is an explanatory view showing a simulation result of flow velocity of an air flow from the air-conditioning register 100 in the first rotation state. In the air-conditioning register 100 of the present embodiment, the direction of air blown from the air-conditioning register 100 can be vertically adjusted along the vertical direction by rotating the lid assembly 60. The user can adjust the direction of air by rotating the lid assembly 60 in the up and down direction by manually operating the exposed surface 606, for example. The rotation of the lid assembly 60 is not necessarily performed by manually operating the exposed surface 606, and may be performed by an operation lever or the like that is provided via a link mechanism connected to the lid assembly 60. When the lid assembly 60 is rotated upward as shown by an arrow D20, the direction of the lid assembly 60 is changed from the direction DT1 shown in FIG. 5 to a direction DT2. As a result, the air-conditioning register 100 can be brought into the first rotation state shown in FIG. 8.

In the first rotation state, compared with the neutral state, the flow passage length of the first retainer ventilation passage 612 is increased from the flow passage length W11 to a flow passage length W12 while the first ventilation passage distance T1 of the first retainer ventilation passage 612 shown in FIG. 5 is maintained. Further, the flow passage length of the second retainer ventilation passage 614 is reduced from the flow passage length W21 to a flow passage length W22 while the second ventilation passage distance T2 of the second retainer ventilation passage 614 is maintained. In other words, the first rotation state is a state in which, compared with the neutral state, the flow passage resistance of the first retainer ventilation passage 612 is increased by an amount corresponding to an increase in the flow passage length, and the flow passage resistance of the second retainer ventilation passage 614 is decreased by an amount corresponding to a reduction in the flow passage length.

As shown by arrows S31, S41 in FIG. 8, air-conditioning air that flows into the retainer ventilation passage 30S from the inflow port 305 flows to the protruding portion 684 of the flow dividing portion 68. Then, as shown by arrows S32, S42, the air-conditioning air is divided by the protruding portion 684 into air for the first inner flow passage 601 and air for the second inner flow passage 603, and is then guided to the first slit 602 and the second slit 604. Air flowing through the first inner flow passage 601 is sent to the outside of the lid assembly 60 from the first slit 602 and, as shown by an arrow S33, flows through the first retainer ventilation passage 612 having an increased flow passage length. Air flowing through the second inner flow passage 603 is sent to the outside of the lid assembly 60 from the second slit 604 and, as shown by an arrow S43, flows through the second retainer ventilation passage 614 having a reduced flow passage length.

In the first rotation state, the flow rate of air blown from the second air outlet 102 and shown by an arrow S44 is larger than that in the neutral state due to a decrease in flow passage resistance, and is also larger than the flow rate of air blown from the first air outlet 101 and shown by an arrow S34. Therefore, the point at which air from the first air outlet 101 merges with air from the second air outlet 102 is at a higher position than that in the neutral state. As a result, as shown by an arrow S202 in FIG. 8 and FIG. 9, air blown from the air-conditioning register 100 flows upward with respect to the horizontal direction, that is, flows in a direction at an angle of elevation.

Although not shown in the drawing, in the air-conditioning register 100 of the present embodiment, by bringing the lid assembly 60 into a second rotation state in which the lid assembly 60 is rotated downward compared with the neutral state, it is also possible to cause air blown into the vehicle compartment from the air-conditioning register 100 to be directed downward at an angle larger than that in the neutral state. The second rotation state can be established by rotating the lid assembly 60 to cause a state in which the lid assembly 60 in the first rotation state is inverted upside down with respect to the direction DT1, for example. In the second rotation state, compared with the neutral state, the flow passage length of the first retainer ventilation passage 612 is reduced while the first ventilation passage distance T1 of the first retainer ventilation passage 612 is maintained, but the flow passage length of the second retainer ventilation passage 614 is increased while the second ventilation passage distance T2 of the second retainer ventilation passage 614 is maintained. With such operations, compared with the neutral state, flow passage resistance is decreased in the first retainer ventilation passage 612 by an amount corresponding to a reduction in flow passage length, and flow passage resistance is increased in the second retainer ventilation passage 614 by an amount corresponding to an increase in flow passage length. As a result, it is possible to cause air blown from the air-conditioning register 100 to flow downward with respect to the horizontal direction, that is, to flow in a direction at an angle of depression.

As has been described heretofore, the air-conditioning register 100 of the present embodiment includes the retainer 30 including the retainer inner wall 30W and the retainer opening portion 306, and having a cylindrical shape, the retainer inner wall 30W defining the retainer ventilation passage 30S, the retainer opening portion 306 being provided at the downstream end of the retainer ventilation passage 30S, and the lid assembly 60 disposed in the retainer 30. The lid assembly 60 has the exposed surface 606 and the retainer facing surface, the exposed surface 606 being exposed from the retainer opening portion 306, the retainer facing surface facing the retainer opening portion 306 and defining the air outlets between the retainer facing surface and the retainer opening portion 306. By exposing the lid assembly 60 through the retainer opening portion 306 from the inside of the retainer 30, it is possible to obtain the air-conditioning register 100 in which the internal structure is prevented from being easily visually perceived and hence, design properties are enhanced.

According to the air-conditioning register 100 of the present embodiment, the retainer opening portion 306 has the first side 306s1 and the second side 306s2 that faces the first side 306s1. The front surface 626 serving as the retainer facing surface defines the first air outlet 101 and the second air outlet 102, the first air outlet 101 being formed between the front surface 626 and the first side 306s1, the second air outlet 102 being formed between the front surface 626 and the second side 306s2. The air outlet is provided at two positions and hence, it is possible to increase the range within which air flow is blown from the air-conditioning register 100.

According to the air-conditioning register 100 of the present embodiment, the first air outlet 101 and the second air outlet 102 are configured such that the blowing direction DS1 of air blown from the first air outlet 101 intersects with the blowing direction DS2 of air blown from the second air outlet 102 at the intersection IS. Air blown from the first air outlet 101 is caused to merge with air blown from the second air outlet 102 and hence, it is possible to easily adjust the flow direction of air blown from the air-conditioning register 100 by a simple method, that is, by adjusting a balance of the flow rate of air, for example, between the first air outlet 101 and the second air outlet 102.

The air-conditioning register 100 of the present embodiment further includes the flow dividing portion 68 that is disposed in the retainer 30, and that divides the retainer ventilation passage 30S into the first retainer ventilation passage 612 and the second retainer ventilation passage 614. With such a configuration, it is possible to cause air to flow through a plurality of air outlets, that is, through the first air outlet 101 and the second air outlet 102, with a simple configuration without forming two flow passages individually communicating with the first retainer ventilation passage 612 and the second retainer ventilation passage 614 and without individually providing a source of air-conditioning air for the first retainer ventilation passage 612 and for the second retainer ventilation passage 614.

According to the air-conditioning register 100 of the present embodiment, the lid assembly 60 is configured to be rotatable in the retainer 30. The lid assembly 60 is configured to be changeable between the first rotation state and the second rotation state by rotating the lid assembly 60, the first rotation state being a state in which the flow passage resistance of the first retainer ventilation passage 612 is increased by increasing the first facing area while the first ventilation passage distance T1 is maintained, and the flow passage resistance of the second retainer ventilation passage 614 is reduced by reducing the second facing area while the second ventilation passage distance T2 is maintained, the second rotation state being a state in which the flow passage resistance of the first retainer ventilation passage 612 is reduced by reducing the first facing area while the first ventilation passage distance T1 is maintained, and the flow passage resistance of the second retainer ventilation passage 614 is increased by increasing the second facing area while the second ventilation passage distance T2 is maintained. It is possible to adjust the flow rate of air at the first air outlet 101 and the flow rate of air at the second air outlet 102 by a simple method, that is, by rotating the lid assembly 60. In the case in which air from the first air outlet 101 is caused to merge with air from the second air outlet 102, it is possible to change the flow direction of merged air by a simple method, that is, by rotating the lid assembly 60. Further, the flow direction of air can be adjusted depending on the balance between the flow rate, at the first air outlet 101, of air to be merged, and the flow rate, at the second air outlet 102, of air to be merged and hence, compared with the conventional technique that uses fins or the like, it is possible to adjust the flow direction of air blown from the air-conditioning register 100, with a wider range.

According to the air-conditioning register 100 of the present embodiment, the first distance T10 between the first side 306s1 of the retainer opening portion 306 and the retainer facing surface at the first air outlet 101 is equal to the second distance T20 between the second side 306s2 and the retainer facing surface at the second air outlet 102. By adopting the configuration in which the opening width of the first air outlet 101 is equal to the opening width of the second air outlet 102, it is possible to easily make the flow rate of air flow from the first air outlet 101 and the flow rate of air flow from the second air outlet 102 uniform. Further, the two air outlets are symmetrical to each other and hence, it is possible to enhance design properties of the air-conditioning register 100.

According to the air-conditioning register 100 of the present embodiment, the air-conditioning register 100 includes the first fins 664 provided in the first retainer ventilation passage 612, configured to be rotatable about axes that intersect with the first retainer inner wall 302W, and having a flat plate shape, and includes the second fins 665 provided in the second retainer ventilation passage 614, configured to be rotatable about axes that intersect with the second retainer inner wall 304W, and having a flat plate shape. It is possible to laterally change the flow direction of air at the first air outlet 101 and the flow direction of air at the second air outlet 102 in the vehicle width direction by a simple method, that is, by rotating the first fins 664 and the second fins 665.

According to the air-conditioning register 100 of the present embodiment, the exposed surface 606 is a curved surface that protrudes toward the outside of the air-conditioning register 100. By causing the exposed surface 606 to be a curved surface, it is possible to enhance design properties of the air-conditioning register 100. Further, an air flow blown from the first air outlet 101 can be caused to easily merge with an air flow blown from the second air outlet 102 in the vicinity of the exposed surface 606 by utilizing the Coanda effect and hence, it is possible to adjust the flow rate and the blowing direction of an air flow from the air-conditioning register 100 in a stable manner.

According to the air-conditioning register 100 of the present embodiment, a configuration is adopted in which the first distance T10 at the first air outlet 101 and the second distance T20 at the second air outlet 102 are set to 1 millimeter or more and 10 millimeters or less. Accordingly, it is possible to provide the air-conditioning register 100 having a good balance between design properties of the air-conditioning register 100 and the flow rate of air blown from the air-conditioning register 100.

The air-conditioning register 100 of the present embodiment includes the retainer 30 having a cylindrical shape, the flow dividing portion 68, and the functional member, the retainer 30 defining the retainer ventilation passage 30S, the flow dividing portion 68 being disposed in the retainer 30, and dividing the retainer ventilation passage 30S into the first retainer ventilation passage 612 and the second retainer ventilation passage 614, the functional member including at least either one of the function part or the operation part, the function part being configured to vary the function of the air-conditioning register 100, the operation part being provided to operate devices provided to the vehicle 80 that includes the air-conditioning register 100. At least a portion of the functional member is disposed in the space SP defined between the first retainer ventilation passage 612 and the second retainer ventilation passage 614. The function part that can vary the function of the air-conditioning register 100 is disposed in the space SP defined between the plurality of flow passages and hence, it is possible to effectively use the space SP. According to the air-conditioning register 100 of the present embodiment, the function part is disposed in the space SP and hence, it is possible to achieve a reduction in size of the air-conditioning register 100.

According to the air-conditioning register 100 of the present embodiment, the functional member includes the fins 66 as the function part, each fin 66 including the first fin 664, the second fin 665, and the shaft portion 666 serving as the fin coupling portion that couples the first fin 664 to the second fin 665, and the shaft portions 666 are disposed in the space SP. The fin coupling portions are provided between the first retainer ventilation passage 612 and the second retainer ventilation passage 614 and hence, compared with the case in which the fin coupling portions are provided at positions outside the space SP, it is possible to shorten the length of the fin coupling portions.

According to the air-conditioning register 100 of the present embodiment, each shaft portion 666 serving as the fin coupling portion is a shaft body having a rod shape, and the shaft portions 666 are disposed in the space SP. Accordingly, each fin coupling portion is a shaft body having a rod shape and hence, compared with the case in which each fin coupling portion is a plate-like member, it is possible to reduce a region in which the space SP is occupied by the fin coupling portions, leading to a further effective use of the space SP.

The air-conditioning register 100 of the present embodiment includes the synchronization portion 670 as the function part, the synchronization portion 670 coupling the fin coupling portions of the plurality of fins 66 to each other in order to synchronize actions of the plurality of fins 66, and the synchronization portion 670 is disposed in the space SP. The synchronization portion 670 serving as the function part is provided in the space SP and hence, compared with the case in which the synchronization portion 670 is provided at a position outside the space SP, it is possible to effectively use the space SP, leading to a reduction in size of the air-conditioning register 100.

A1. Another Embodiment

Figure 10:
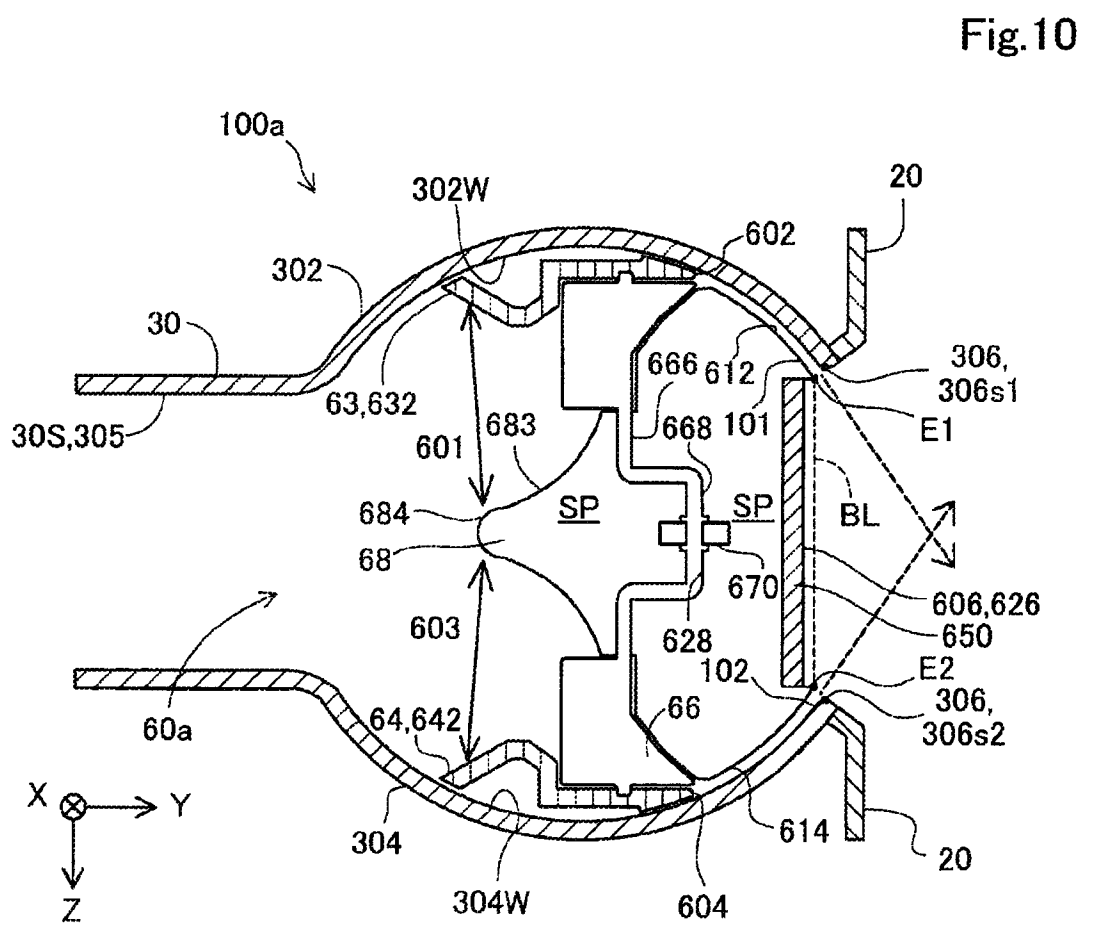

FIG. 10 is a perspective view showing a configuration of an air-conditioning register 100a according to another embodiment of the first embodiment. The air-conditioning register 100a of the other embodiment differs from the air-conditioning register 100 of the first embodiment in that the air-conditioning register 100a includes a lid assembly 60a in place of the lid assembly 60. However, other configurations of the air-conditioning register 100a are substantially equal to the corresponding configurations of the air-conditioning register 100. The lid assembly 60a differs from the lid assembly 60 in that an operation part 650 is provided in a recessed portion formed on a front surface 626 of the front wall portion 62. The operation part 650 is disposed in a space SP defined between the first retainer ventilation passage 612 and the second retainer ventilation passage 614. In the present embodiment, the space SP is a space enclosed by a virtual straight line BL and the flow dividing portion 68, the virtual straight line BL connecting the first air outlet 101 and the second air outlet 102. The straight line BL is, for example, a straight line that connects an intersection E1 between the normal of a first side 306s1 and the front wall portion 62 and an intersection E2 between the normal of a second side 306s2 and the front wall portion 62. The operation part 650 is, for example, an operation panel provided to adjust the temperature of air-conditioning air blown from the air-conditioning register 100a.

According to the air-conditioning register 100a of the present embodiment, the functional member is the operation panel forming the operation part 650 and provided to adjust the temperature of an air flow blown from the air-conditioning register 100a, and the operation panel is disposed in the space SP. Accordingly, the operation part 650 is disposed in the space SP defined between the plurality of flow passages, the operation part 650 being provided to operate the devices provided to the vehicle 80 that includes the air-conditioning register 100a and hence, it is possible to effectively use the space SP. According to the air-conditioning register 100a of the present embodiment, the operation part is disposed in the space SP and hence, it is possible to achieve a reduction in size of the air-conditioning register 100a.

B. Second Embodiment

Figure 11:
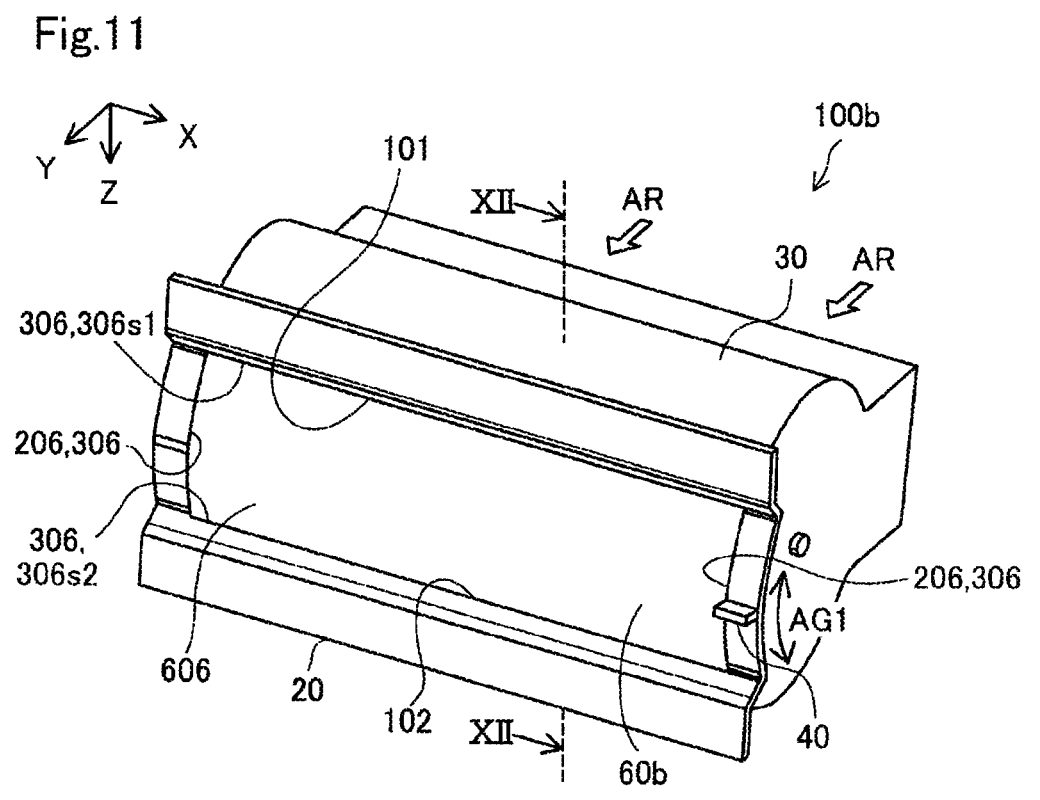

FIG. 11 is a perspective view showing an external configuration of an air-conditioning register 100b according to a second embodiment. The air-conditioning register 100b of the second embodiment differs from the air-conditioning register 100 of the first embodiment in that the air-conditioning register 100b includes a lid assembly 60b in place of the lid assembly 60, and further includes an operation lever 40. However, other configurations of the air-conditioning register 100b are substantially equal to the corresponding configurations of the air-conditioning register 100. The first embodiment shows the example in which the lid assembly 60 is rotatably supported in the retainer ventilation passage 30S. In contrast, in the present embodiment, the lid assembly 60b is fixed in a retainer ventilation passage 30S and, as will be described later, the flow rate of air at a first air outlet 101b and the flow rate of air at a second air outlet 102b are adjusted by operating a flow dividing portion 68b by using the operation lever 40.

Figure 12:
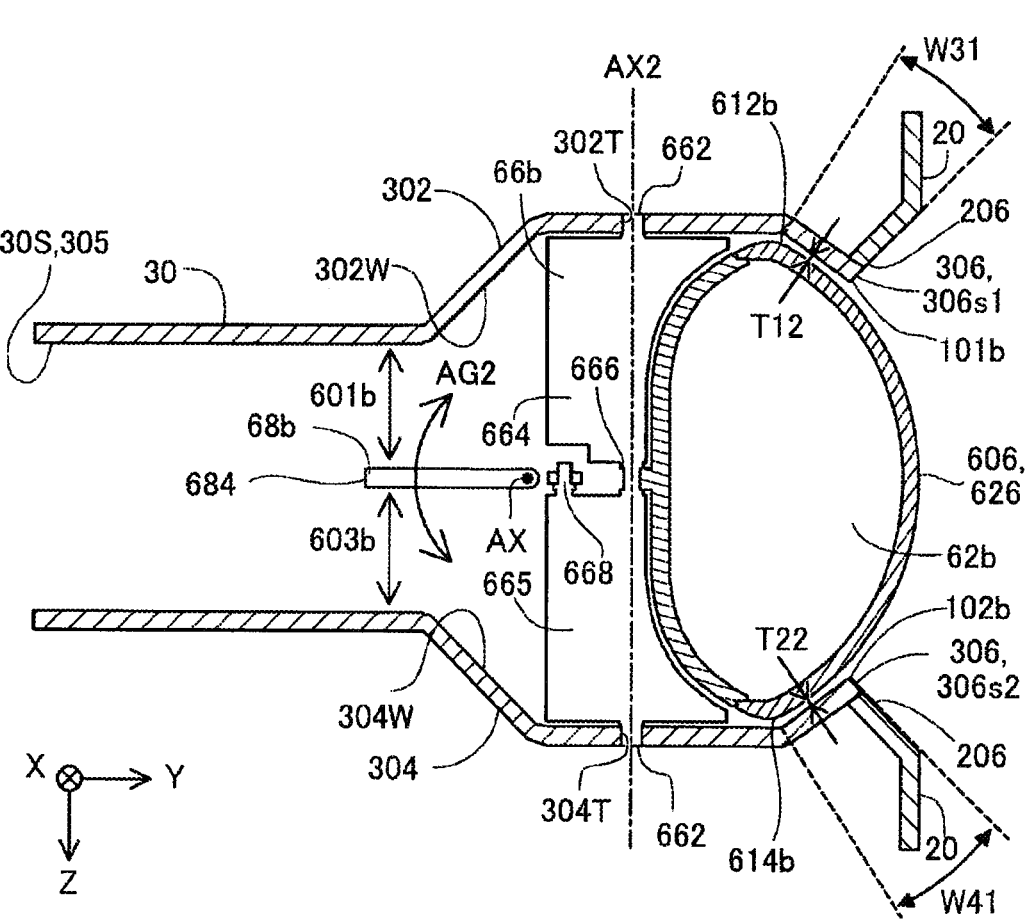
FIG. 12 is a cross-sectional view taken along XII-XII in FIG. 11.

FIG. 12 is a cross-sectional view taken along XII-XII in FIG. 11. FIG. 12 shows the air-conditioning register 100*b* in a neutral state. In the same manner as the first embodiment, the neutral state of the air-conditioning register 100*b* is established when the internal structure becomes mirror symmetric with respect to the Y direction including a center axis AX.

As shown in FIG. 12, the lid assembly 60*b* includes a front wall portion 62*b*, fins 66*b*, and the flow dividing portion 68*b*. The lid assembly 60*b* differs from the lid assembly 60 described in the first embodiment in that the lid assembly 60*b* does not include the upper wall portion 63, the lower wall portion 64, the first slit 602, and the second slit 604. A first retainer ventilation passage 612*b* and a second retainer ventilation passage 614*b* are formed outside the lid assembly 60*b*. A first ventilation passage distance T12 of the first retainer ventilation passage 612*b* is substantially equal to a second ventilation passage distance T22 of the second retainer ventilation passage 614*b*, and a flow passage length W31 of the first retainer ventilation passage 612*b* is substantially equal to a flow passage length W41 of the second retainer ventilation passage 614*b*. That is, a configuration is adopted in which the flow passage resistance of the first retainer ventilation passage 612*b* is substantially equal to the flow passage resistance of the second retainer ventilation passage 614*b*. Configurations of the first air outlet 101*b* and the second air outlet 102*b* are substantially equal to the configurations of the first air outlet 101 and the second air outlet 102 described in the first embodiment and hence, the description of the first air outlet 101*b* and the second air outlet 102*b* will be omitted.

The front wall portion 62*b* is the same as the front wall portion 62 described in the first embodiment in having the front surface 626 having substantially the same cross sectional shape, but differs in not including the shaft fitting portion 628. The front wall portion 62*b* is fixed to a retainer inner wall 30W by a fixture not shown in the drawing.

Each fin 66*b* rotates about a center axis AX2 in the lid assembly 60*b*. The fin 66*b* differs from the fin 66 described in the first embodiment in shape, but other functions and configurations are substantially equal to the corresponding other functions and configurations of the fin 66. In the present embodiment, the protruding portion 662 at the upper end of each fin 66*b* is fitted in a fitting hole 302T of the first retainer inner wall 302W in place of being fitted in the fitting hole 638 of the upper wall portion 63, and the protruding portion 662 at the lower end of each fin 66*b* is fitted in a fitting hole 304T of the second retainer inner wall 304W in place of being fitted in the fitting hole 648 of the lower wall portion 64. Rotation of the fins 66*b* can be adjusted by operating an operation lever not shown in the drawing, for example.

The flow dividing portion 68*b* is a plate-like member extending along the vehicle width direction. The end portion of the flow dividing portion 68*b* on the upstream side serves as a protruding portion 684, thus vertically dividing the retainer ventilation passage 30S. In the example shown in FIG. 13, the flow dividing portion 68*b* is disposed in the retainer ventilation passage 30S such that the direction of the surface of the flow dividing portion 68*b* is a direction DT3, which is substantially aligned with the horizontal plane. In the present embodiment, the direction of the flow dividing portion 68*b* can be defined by the direction of the surface of the flow dividing portion 68*b*.

In the present embodiment, a first inner flow passage 601*b* is formed between the upper surface of the flow dividing portion 68*b* and the first retainer inner wall 302W, and a second inner flow passage 603*b* is formed between the lower surface of the flow dividing portion 68*b* and the second retainer inner wall 304W. The first inner flow passage 601*b* communicates with the first air outlet 101*b* via the first retainer ventilation passage 612*b*, and the second inner flow passage 603*b* communicates with the second air outlet 102*b* via the second retainer ventilation passage 614*b*.

The flow dividing portion 68*b* is supported on the retainer inner wall 30W in such a way as to be rotatable about the center axis AX as shown by an arrow AG2 in FIG. 12, the center axis AX being set in the vicinity of the end portion of the flow dividing portion 68*b* on the downstream side. The flow dividing portion 68*b* is coupled to the operation lever 40 shown in FIG. 11 by means of a link mechanism not shown in the drawing. By operating the operation lever 40 in the up and down direction shown by an arrow AG1 in FIG. 11, it is possible to rotate the flow dividing portion 68*b* about the center axis AX. With such an operation, the flow dividing portion 68*b* is changed between a first flow division state and a second flow division state, the protruding portion 684 being proximate to the first retainer inner wall 302W in the first flow division state, the protruding portion 684 being proximate to the second retainer inner wall 304W in the second flow division state. The first flow division state is a state in which the degree of opening of the first inner flow passage 601*b* communicating with the first retainer ventilation passage 612*b* is reduced, but the degree of opening of the second inner flow passage 603*b* communicating with the second retainer ventilation passage 614*b* is increased. The second flow division state is a state in which the degree of opening of the first inner flow passage 601*b* is increased, but the degree of opening of the second inner flow passage 603*b* is reduced.

Figure 13:
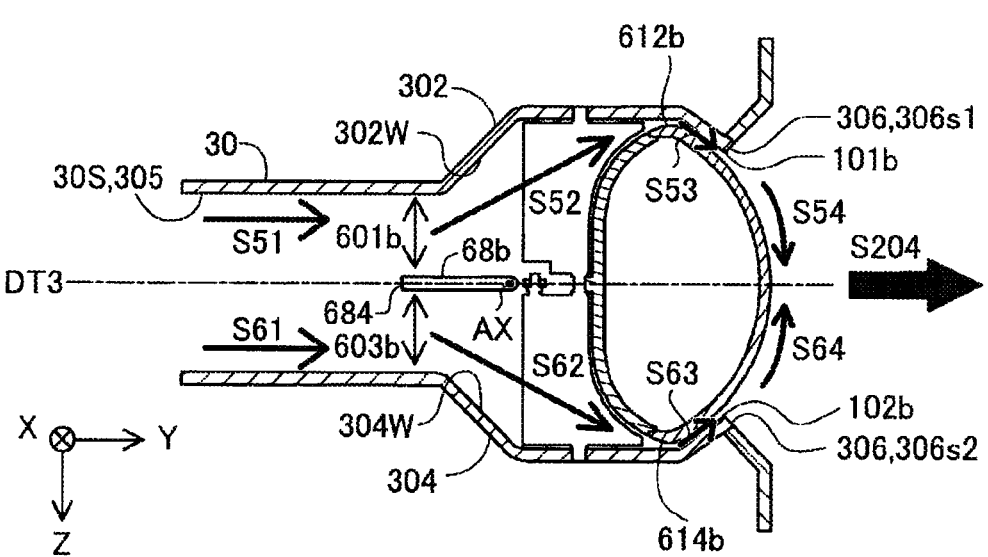
FIG. 13 is an explanatory view schematically showing flow directions of air in the air-conditioning register in a neutral state.

FIG. 13 is an explanatory view schematically showing flow directions of air-conditioning air in the air-conditioning register 100*b* in the neutral state. When the air-conditioning register 100*b* is in the neutral state, the degree of opening of the first inner flow passage 601*b* that is determined by the flow dividing portion 68*b* is substantially equal to the degree of opening of the second inner flow passage 603*b* that is determined by the flow dividing portion 68*b*. As shown by arrows S51, S61 in FIG. 13, air-conditioning air that flows into the retainer ventilation passage 30S from the inflow port 305 flows to the protruding portion 684 of the flow dividing portion 68*b*. Then, as shown by arrows S52, S62, the air-conditioning air is divided by the protruding portion 684 into air for the first inner flow passage 601*b* and air for the second inner flow passage 603*b*.

Air flowing through the first inner flow passage 601*b* flows through the first retainer ventilation passage 612*b* as shown by an arrow S53. Air flowing through the second inner flow passage 603*b* flows through the second retainer ventilation passage 614*b* as shown by an arrow S63. The flow passage resistance of the first retainer ventilation passage 612*b* is substantially equal to the flow passage resistance of the second retainer ventilation passage 614*b*, and the flow rate of air blown from the first air outlet 101*b* is substantially equal to the flow rate of air blown from the second air outlet 102*b*.

As shown by arrows S54, S64, air blown to the outside of the retainer 30 from the first air outlet 101*b* and air blown to the outside of the retainer 30 from the second air outlet 102*b* flow on the front surface 626 due to the Coanda effect, and then merge with each other on the front surface 626 or at a position separated from the front surface 626 due to separation. The merged air flows toward the front side of the air-conditioning register 100*b* along the substantially horizontal direction as shown by an arrow S204.

Figure 14:
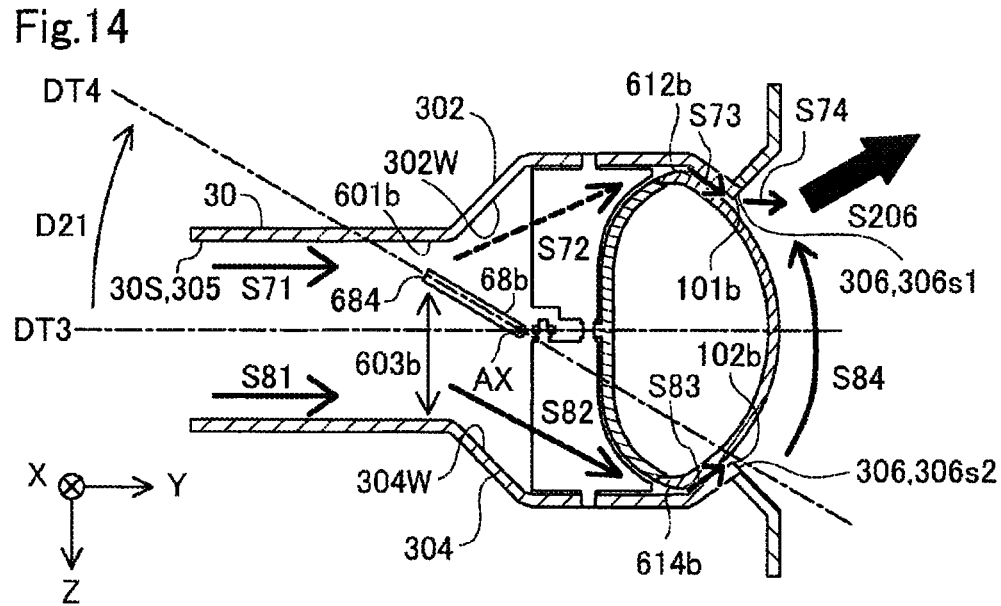
FIG. 14 is an explanatory view showing flow directions of air in the air-conditioning register in a first flow division state.

FIG. 14 is an explanatory view showing flow directions of air in the air-conditioning register 100*b* in the first flow division state. When the flow dividing portion 68*b* is rotated upward as shown by an arrow D21 due to operation of the operation lever 40, the direction of surface of the flow dividing portion 68*b* is changed from the direction DT3 to a direction DT4. As a result, it is possible to establish the first flow division state shown in FIG. 14.

As shown by arrows S71, S81, air-conditioning air flows to the protruding portion 684 of the flow dividing portion 68*b*. Air that reaches the protruding portion 684 flows into the first inner flow passage 601*b* as shown by an arrow S72 with the flow rate reduced by the flow dividing portion 68*b*, and also flows into the second inner flow passage 603*b* as shown by an arrow S82 with the flow rate increased. Air that flows into the first inner flow passage 601*b* flows through the first retainer ventilation passage 612*b* as shown by an arrow S73, and air that flows into the second inner flow passage 603*b* flows through the second retainer ventilation passage 614*b* as shown by an arrow S83.

In the first flow division state, the flow rate of air that is sent to the second retainer ventilation passage 614*b* is larger than that in the neutral state, and is also larger than the flow rate of air that is sent to the first retainer ventilation passage 612*b*. Accordingly, the flow rate of air blown from the second air outlet 102*b* and shown by an arrow S84 is larger than the flow rate of air blown from the first air outlet 101*b* and shown by an arrow S74. Therefore, the point at which air from the first air outlet 101 merges with air from the second air outlet 102*b* is at a higher position than that in the neutral state. As a result, as shown by an arrow S206 in FIG. 14, air blown from the air-conditioning register 100*b* is directed upward at an angle larger than that in the neutral state.

Although not shown in the drawing, in the air-conditioning register 100*b* of the present embodiment, by bringing the flow dividing portion 68*b* into the second flow division state in which the flow dividing portion 68*b* is rotated downward compared with the neutral state by operating the operation lever 40, it is also possible to cause air blown into the vehicle compartment from the air-conditioning register 100*b* to be directed downward at an angle larger than that in the neutral state. The second flow division state can be established by rotating the flow dividing portion 68*b* to cause a state in which the flow dividing portion 68*b* in the first flow division state is inverted upside down with respect to the direction DT3, for example. In the second flow division state, compared with the neutral state, a flow rate in the first retainer ventilation passage 612*b* is increased by increasing the degree of opening of the first retainer ventilation passage 612*b*, but a flow rate in the second retainer ventilation passage 614*b* is reduced by reducing the degree of opening of the second retainer ventilation passage 614*b*. As a result, it is possible to cause air blown from the air-conditioning register 100 to flow downward with respect to the horizontal direction, that is, to flow along the direction at an angle of depression.

According to the air-conditioning register 100*b* of the present embodiment, the flow dividing portion 68*b* is changeable between the first flow division state and the second flow division state. In the first flow division state, the degree of opening of the first inner flow passage 601*b*, communicating with the first retainer ventilation passage 612*b*, is reduced while the degree of opening of the second inner flow passage 603*b*, communicating with the second retainer ventilation passage 614*b*, is increased. In the second flow division state, the degree of opening of the second inner flow passage 603*b* is reduced by increasing the degree of opening of the first inner flow passage 601*b*. It is possible to change the direction of air blown from the air-conditioning register 100*b* by a simple configuration, that is, by adjusting the flow rate in the first inner flow passage 601*b* and the flow rate in the second inner flow passage 603*b* with the flow dividing portion 68*b* in place of changing flow passage resistance in the air-conditioning register 100*b*.

C. Third Embodiment

Figure 15:
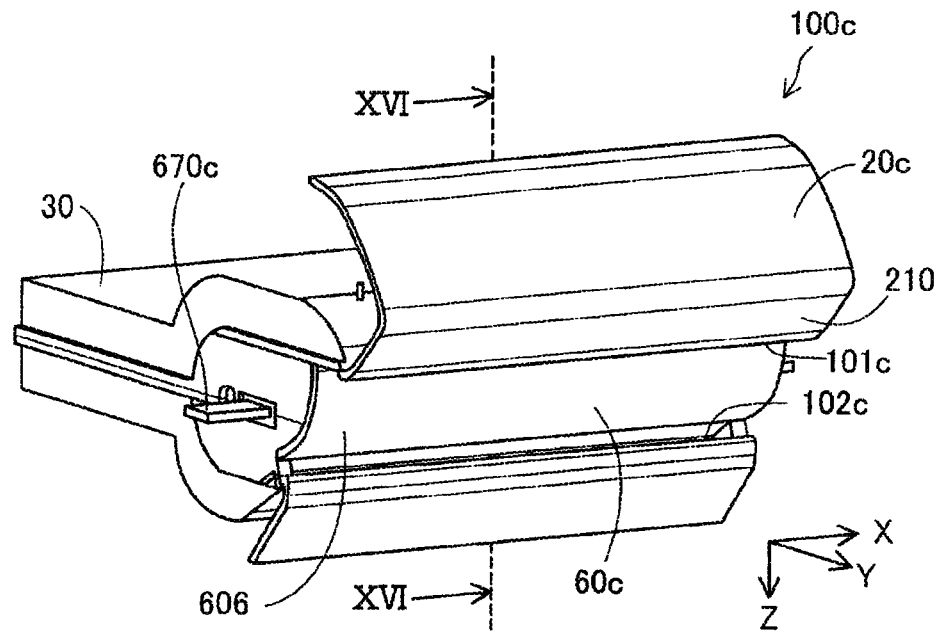
FIG. 15 is a perspective view showing an external configuration of an air-conditioning register according to a third embodiment.

FIG. 15 is a perspective view showing an external configuration of an air-conditioning register 100*c* according to a third embodiment. The air-conditioning register 100*c* of the third embodiment differs from the air-conditioning register 100 of the first embodiment in that the air-conditioning register 100*c* includes a lid assembly 60*c* in place of the lid assembly 60 and includes a bezel 20*c* in place of the bezel 20. However, other configurations of the air-conditioning register 100*c* are substantially equal to the corresponding configurations of the air-conditioning register 100. In the present embodiment, the lid assembly 60*c* is fixed in a retainer ventilation passage 30S as in the case of the lid assembly 60*b* described in the second embodiment, and the flow rate of air at a first air outlet 101*c* and the flow rate of air at a second air outlet 102*c* are adjusted by operating a flow dividing portion 68*c*, which will be described later.

Figure 16:
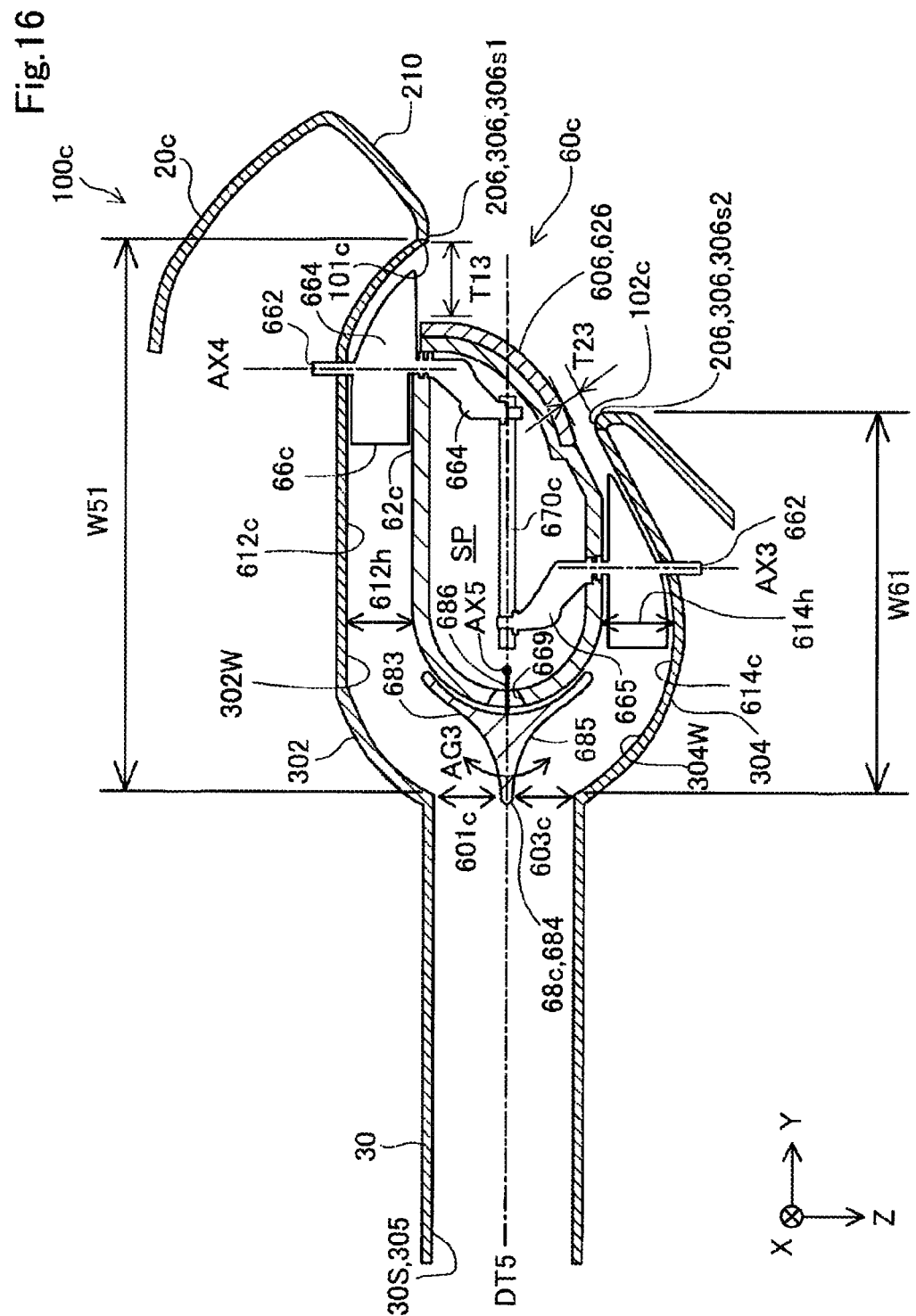
FIG. 16 is a cross-sectional view taken along XVI-XVI in FIG. 15.

FIG. 16 is a cross-sectional view taken along XVI-XVI in FIG. 15. FIG. 16 shows the air-conditioning register 100*c* in the neutral state. The neutral state of the air-conditioning register 100*c* can be established by causing the direction of the flow dividing portion 68*c* to be substantially aligned with the Y direction. In the present embodiment, the direction of the flow dividing portion 68*c* can be defined by a straight line DT5 that connects the distal end of a protruding portion 684 and a rotary shaft AX5 of the flow dividing portion 68*c*, for example.

As shown in FIG. 16, a synchronization portion 670*c*, being the functional member of the air-conditioning register 100*c*, is disposed in a space SP defined between a first retainer ventilation passage 612*c* and a second retainer ventilation passage 614*c*. In the present embodiment, the space SP is a space enclosed by a front wall portion 62*c* and the flow dividing portion 68.

As shown in FIG. 16, the lid assembly 60*c* includes a front wall portion 62*c*, a plurality of fins 66*c*, a synchronization portion 670*c*, and the flow dividing portion 68*c*. The lid assembly 60*c* differs from the lid assembly 60 described in the first embodiment in that the lid assembly 60*c* does not include the upper wall portion 63, the lower wall portion 64, the first slit 602, and the second slit 604. A first retainer ventilation passage 612*c* and a second retainer ventilation passage 614*c* are formed outside the lid assembly 60*c*.

The front wall portion 62*c* is the same as the front wall portion 62 described in the first embodiment in having the front surface 626, but differs in not including the shaft fitting portion 628. The front wall portion 62*c* is fixed to a retainer inner wall 30W by a fixture not shown in the drawing.

In each fin 66*c*, a first fin 664 and a second fin 665 are separate bodies, and respectively have center axes AX3, AX4 shown in FIG. 16. The synchronization portion 670*c* couples the first fin 664 to the second fin 665 to synchronize the rotational direction of the respective fins. The synchronization portion 670*c* has a flat plate shape extending in the vehicle width direction. By causing the synchronization portion 670c to have a flat plate shape, it is possible to reduce a region in which the space SP is occupied by the synchronization portion 670c. The synchronization portion 670c extends to the outside of the air-conditioning register 100c as shown in FIG. 15, and is coupled to an operation lever not shown in the drawing outside the air-conditioning register 100c. When the synchronization portion 670c is slid along the vehicle width direction by operating the operation lever, the first fins 664 and the second fins 665 rotate about the center axes AX3, AX4. With such an operation, the direction of air blown from the first air outlet 101c and the second air outlet 102c is laterally changed along the vehicle width direction.

The flow dividing portion 68c has two inclined surfaces consisting of a first inclined surface 683 and a second inclined surface 685. The first inclined surface 683 and the second inclined surface 685 are connected with each other by using the distal end of the protruding portion 684 as an apex. The first inclined surface 683 defines a first inner flow passage 601c between the first inclined surface 683 and a first retainer inner wall 302W, and the second inclined surface 685 defines a second inner flow passage 603c between the second inclined surface 685 and a second retainer inner wall 304W. The first inner flow passage 601c communicates with the first air outlet 101c via the first retainer ventilation passage 612c, and the second inner flow passage 603c communicates with the second air outlet 102c via the second retainer ventilation passage 614c.

The flow dividing portion 68c is supported on the retainer inner wall 30W in such a way as to be rotatable about the rotary shaft AX5 as shown by an arrow AG3 in FIG. 16, the rotary shaft AX5 being located downstream of the flow dividing portion 68c. By operating an operation lever not shown in the drawing, for example, it is possible to rotate the protruding portion 684 of the flow dividing portion 68c about the rotary shaft AX5. The protruding portion 684 is coupled to the rotary shaft AX5 by a shaft coupling portion 686. Therefore, the flow dividing portion 68c can change the retainer ventilation passage 30S between a first flow division state and a second flow division state, the protruding portion 684 being proximate to the first retainer inner wall 302W in the first flow division state, the protruding portion 684 being proximate to the second retainer inner wall 304W in the second flow division state. In the present embodiment, a restricting portion 669 is formed in the lid assembly 60c at a position in the vicinity of the flow dividing portion 68c. The restricting portion 669 is a wall surface that defines a through hole formed in the lid assembly 60c. The restricting portion 669 is disposed between the first retainer ventilation passage 612c and the second retainer ventilation passage 614c, that is, in the space SP. The shaft coupling portion 686 is inserted through the through hole. As a result, the movement of the shaft coupling portion 686 is restricted by the restricting portion 669 to a range from the first flow division state to the second flow division state. Such a configuration facilitates adjustment of a flow rate from the first flow division state to the second flow division state. The restricting portion 669 is covered by the first inclined surface 683 and the second inclined surface 685 of the flow dividing portion 68c. With such a configuration, it is possible to suppress or prevent a situation in which air-conditioning air from the inflow port 305 flows into the restricting portion 669. The first flow division state is a state in which the degree of opening of the first inner flow passage 601c is reduced, but the degree of opening of the second inner flow passage 603c is increased. The second flow division state is a state in which the degree of opening of the first inner flow passage 601c is increased, but the degree of opening of the second inner flow passage 603c is reduced. According to the air-conditioning register 100c of the present embodiment, in the same manner as the second embodiment, it is possible to change the direction of air blown from the air-conditioning register 100c by a simple method, that is, by adjusting flow rates with the flow dividing portion 68c.

The air-conditioning register 100c of the present embodiment has a structure in which the first retainer ventilation passage 612c is vertically asymmetrical to the second retainer ventilation passage 614c, so that the internal structure of the air-conditioning register 100c is not mirror symmetric with respect to the Y direction. Specifically, the flow passages and the like in the air-conditioning register 100c have the following features (4) to (6).

(4) A first distance T13 at the first air outlet 101c and a second distance T23 at the second air outlet 102c are set such that the first distance T13 is different from the second distance T23. Specifically, the first distance T13 and the second distance T23 are set such that the first distance T13 is larger than the second distance T23, and the opening width of the first air outlet 101c is larger than the opening width of the second air outlet 102c. In the example shown in FIG. 16, the first distance T13 is set to 10 mm, and the second distance T23 is set to 5 mm. Although not shown in the drawing, the first air outlet 101c and the second air outlet 102c are configured such that the blowing direction of the first air outlet 101c intersects with the blowing direction of the second air outlet 102c at a position in front of the front surface 626.

(5) A total value W51 of the flow passage length of the first inner flow passage 601c and the flow passage length of the first retainer ventilation passage 612c is larger than a total value W61 of the flow passage length of the second inner flow passage 603c and the flow passage length of the second retainer ventilation passage 614c. That is, in the flow passages downstream of the division made by the flow dividing portion 68c, the flow passage to the first air outlet 101c is longer than the flow passage to the second air outlet 102c.

(6) In the flow passages downstream of the division made by the flow dividing portion 68c, the average value of heights 612h of the flow passage to the first air outlet 101c is larger than the average value of heights 614h of the flow passage to the second air outlet 102c.

The above-mentioned features (4) to (6) are set values derived to cause, in the flow passages downstream of the division made by the flow dividing portion 68c, the flow passage resistance of the flow passage to the first air outlet 101c to be substantially equal to the flow passage resistance of the flow passage to the second air outlet 102c. The flow passages and the like in the air-conditioning register 100c have the above-mentioned features (4) to (6) and hence, even in the case in which the air-conditioning register 100c has a vertically asymmetric structure as in the case of the present embodiment, it is possible to set, in the neutral state, the flow rate of air blown from the first air outlet 101c to be substantially equal to the flow rate of air blown from the second air outlet 102c.

The bezel 20c differs from the bezel 20 described in the first embodiment in including a flange portion 210. As shown in FIG. 16, the flange portion 210 is a portion that is continuously formed with a first side 306s1 of a retainer opening portion 306. The flange portion 210 has a shape that protrudes to the outside of the air-conditioning register 100c from the first side 306s1. Such a configuration prevents the first air outlet 101c from being easily visually perceived by the user and hence, even in the case in which the first air outlet 101c is formed with a large opening width as in the case of the present embodiment, it is possible to prevent the first air outlet 101c from being easily visually perceived, thus suppressing a situation in which a structure in the air-conditioning register 100c can be seen by the user in the vehicle compartment. The flange portion may be formed on the retainer 30 in place of the bezel 20c.

Figure 17:
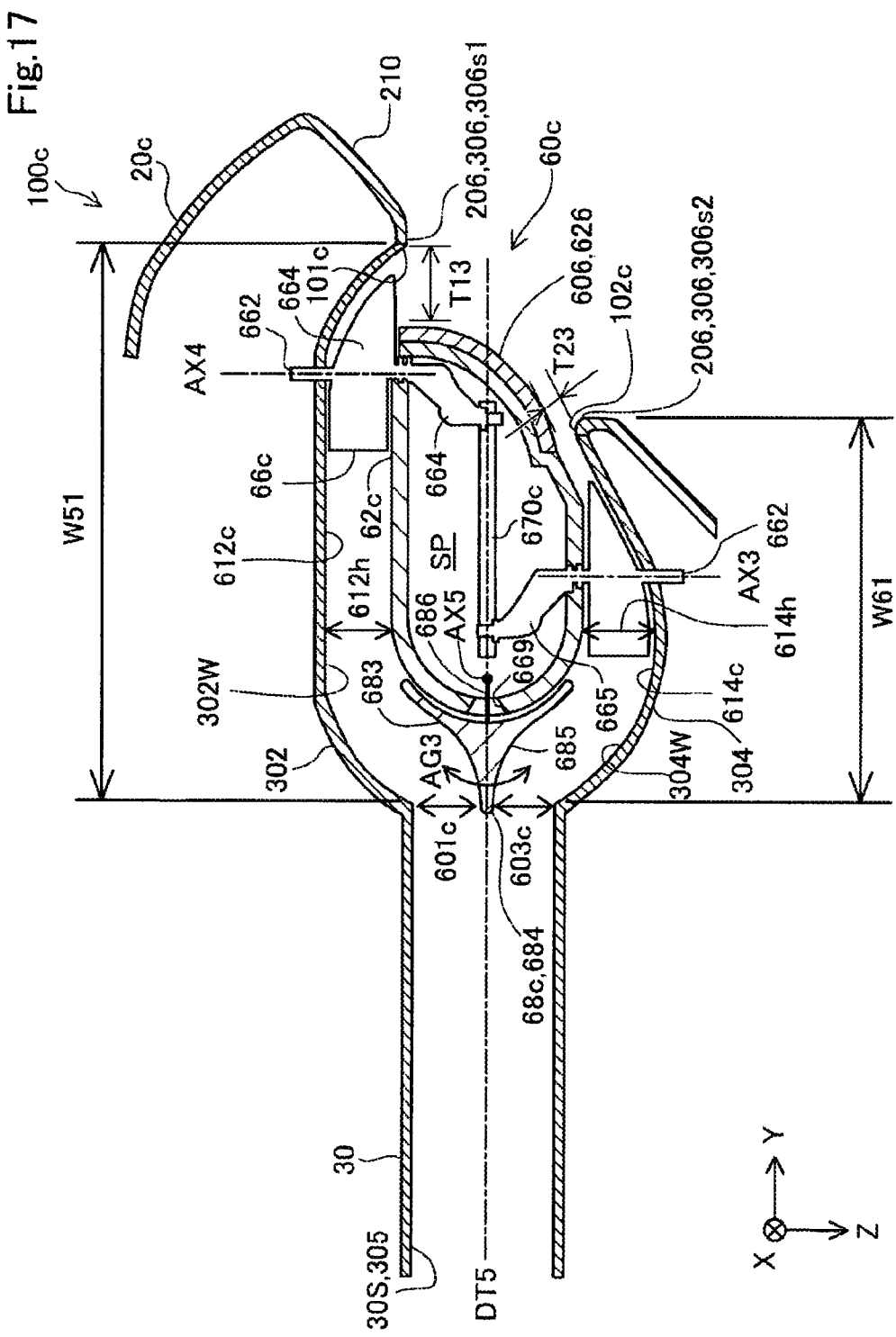
FIG. 17 is an explanatory view schematically showing flow directions of air in the air-conditioning register in a neutral state.
Figure 18:
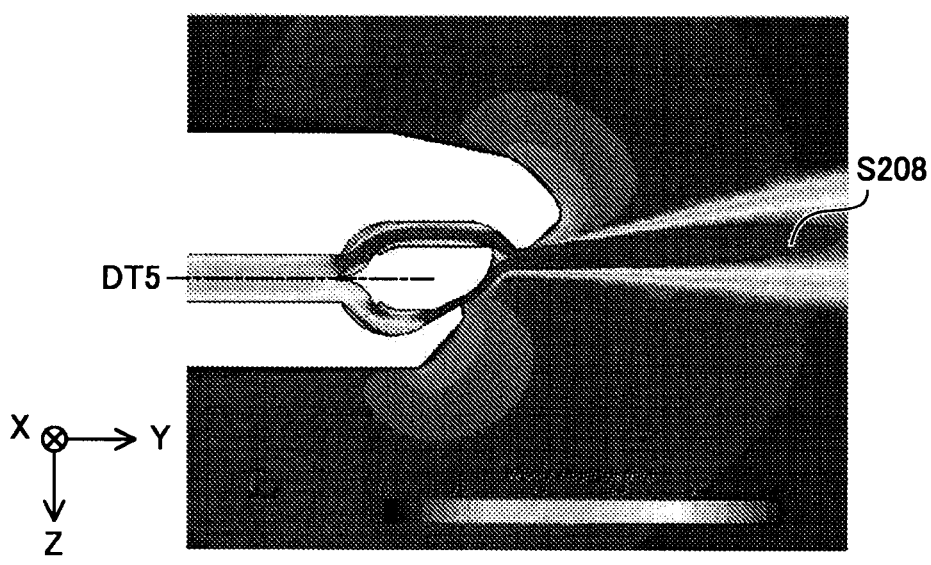
FIG. 18 is an explanatory view showing a simulation result of flow velocity of an air flow from the air-conditioning register in the neutral state.

FIG. 17 is an explanatory view schematically showing flow directions of air-conditioning air in the air-conditioning register 100c in the neutral state. FIG. 18 is an explanatory view showing a simulation result of flow velocity of an air flow from the air-conditioning register 100c in the neutral state. When the air-conditioning register 100c is in the neutral state, the degree of opening of the first inner flow passage 601c that is determined by the flow dividing portion 68c is substantially equal to the degree of opening of the second inner flow passage 603c that is determined by the flow dividing portion 68c. As shown by arrows S91, S101 in FIG. 17, air-conditioning air that flows into the retainer ventilation passage 30S from an inflow port 305 flows to the flow dividing portion 68c. Then, as shown by arrows S92, S102, the air-conditioning air is divided by the protruding portion 684 into air for the first inner flow passage 601c and air for the second inner flow passage 603c.

Air flowing through the first inner flow passage 601c is sent to the first retainer ventilation passage 612c as shown by an arrow S93, and air flowing through the second inner flow passage 603c is sent to the second retainer ventilation passage 614b as shown by an arrow S103. The flow passage resistance of the first retainer ventilation passage 612c is substantially equal to the flow passage resistance of the second retainer ventilation passage 614c, and the flow rate of air blown from the first air outlet 101c is substantially equal to the flow rate of air blown from the second air outlet 102c.

Air blown to the outside from the second air outlet 102c flows on the front surface 626 due to the Coanda effect, and then merges with air blown from the first air outlet 101c on the front surface 626 or at a position separated from the front surface 626 due to separation. As shown by an arrow S208 in FIG. 17 and FIG. 18, the merged air flows toward the front side of the air-conditioning register 100c substantially along the Y direction.

Figure 19:
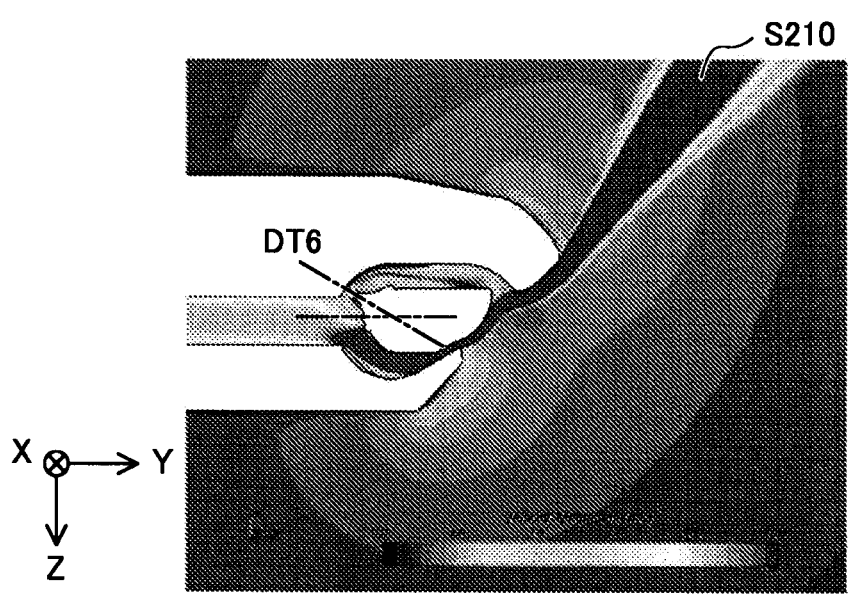
FIG. 19 is an explanatory view showing a simulation result of flow velocity of an air flow from the air-conditioning register in a first flow division state.

FIG. 19 is an explanatory view showing a simulation result of flow velocity of an air flow from the air-conditioning register 100c in the first flow division state. The first flow division state can be established by changing the direction of the flow dividing portion 68c to a direction DT6 directed upward at an angle larger than that of a direction DT5 shown in FIG. 18. In the first flow division state, a flow rate of an air flow from the second air outlet 102c is larger than a flow rate of an air flow from the first air outlet 101c and hence, as shown by an arrow S210 in FIG. 19, air blown from the air-conditioning register 100c flows upward at an angle larger than that in the neutral state.

Figure 20:
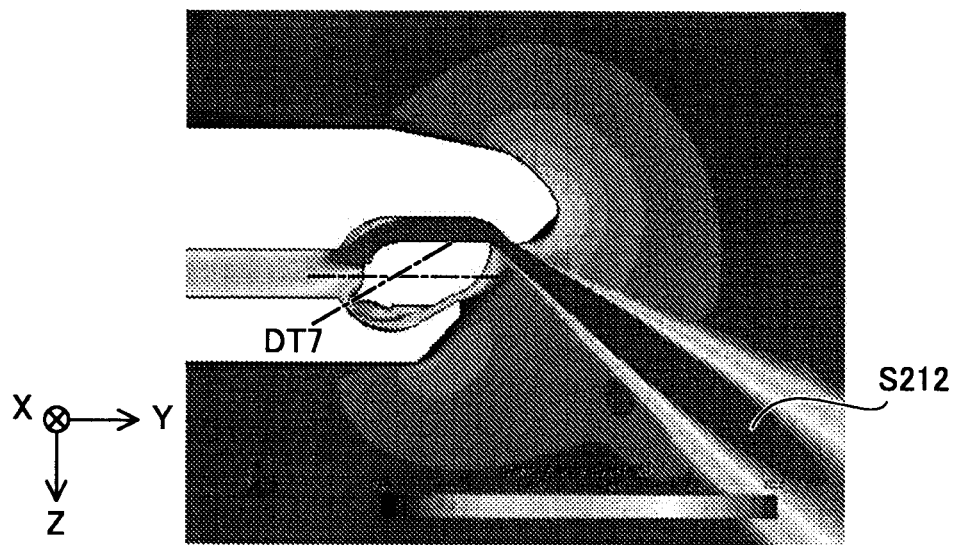
FIG. 20 is an explanatory view showing a simulation result of flow velocity of an air flow from the air-conditioning register in a second flow division state.

FIG. 20 is an explanatory view showing a simulation result of flow velocity of an air flow from the air-conditioning register 100c in the second flow division state. The second flow division state can be established by changing the direction of the flow dividing portion 68c to a direction DT7 directed downward at an angle larger than that of the direction DT5. In the second flow division state, a flow rate of an air flow from the first air outlet 101c is larger than a flow rate of an air flow from the second air outlet 102c and hence, as shown by an arrow S212 in FIG. 20, air blown from the air-conditioning register 100c flows downward at an angle larger than that in the neutral state.

Figure 21:
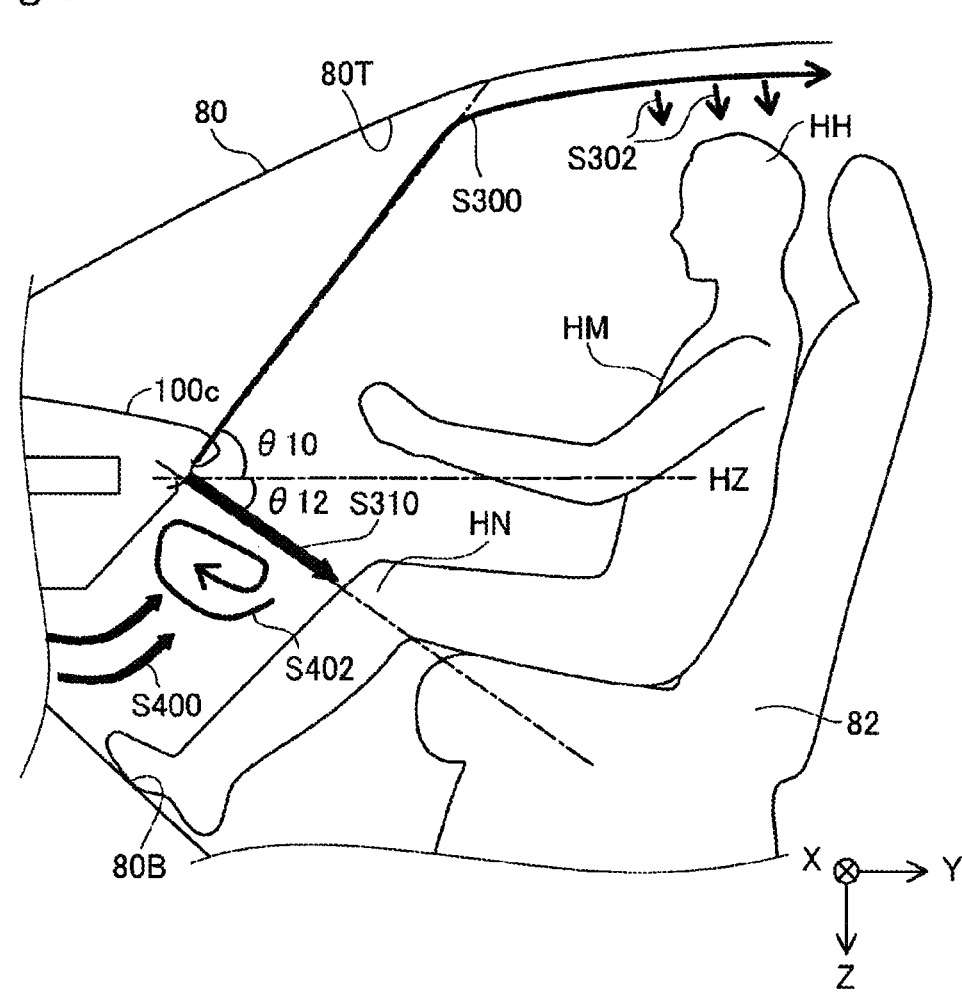
FIG. 21 is an explanatory view showing flow directions of air flows in a vehicle equipped with the air-conditioning register.

FIG. 21 is an explanatory view showing the flow directions of air flows in a vehicle 80 equipped with the air-conditioning register 100c of the present embodiment. FIG. 21 shows a driver HM operating the vehicle 80 on driver's seat 82. The air-conditioning register 100c can adjust the flow direction of an air flow depending on the balance between a flow rate at the first air outlet 101c and a flow rate at the second air outlet 102c. Therefore, compared with the case in which the flow direction of an air flow is adjusted by horizontal blades as in the case of the conventional technique, it is possible to adjust the flow direction of an air flow with a wide range. In general, in an air-conditioning register that uses horizontal blades, a flow direction can be adjusted within a range from an angle of elevation of approximately 30 degrees to an angle of depression of approximately 30 degrees with respect to a horizontal direction HZ. In contrast, in the air-conditioning register 100c of the present embodiment, a flow direction can be adjusted within an angle range from an angle of elevation of approximately 60 degrees shown by an angle θ10 in FIG. 21 to an angle of depression of approximately 35 degrees shown by an angle θ12, or within an angle range equal to or larger than the above-mentioned angle range.

For example, in the case in which cool air is blown from the air-conditioning register 100c in order to cool the inside of the vehicle 80, an air flow at an angle of elevation of 30 degrees directly impinges on a head HH of the driver HM, thus becoming a cause of giving discomfort to the driver HM. In contrast, as shown by an arrow S300, an air flow at an angle of elevation of 60 degrees that is achieved by the air-conditioning register 100c of the present embodiment can be blown toward a ceiling 80T of the vehicle 80 without directly impinging on the head HH of the driver HM. Cool air that reaches the ceiling 80T expands in the vehicle compartment along the ceiling 80T, for example, and becomes a down flow due to characteristics of cool air as shown by an arrow S302, thus cooling the entire vehicle compartment. Accordingly, it is possible to suppress or prevent giving discomfort to the driver HM, and it is also possible to uniformly cool the inside of the vehicle compartment by the down flow from the upper portion of the vehicle compartment.

In the case in which warm air is blown from the air-conditioning register 100c in order to warm the inside of the vehicle 80, for example, an air flow at an angle of depression of 30 degrees has a difficulty in being blown toward a knee HN of the driver HM or toward the lower leg below the knee HN. In contrast, as shown by an arrow S310, an air flow at an angle of depression of 35 degrees or more allows warm air to be blown toward the knee HN or the lower leg. In this case, it is possible to directly warm the lower leg. Further, in the case in which warm air is supplied from a heating device provided to a bottom surface 80B of the vehicle 80 as shown by arrows S400 in order to warm the toes of the driver HM, by causing an air flow at an angle of depression of 35 degrees or more to serve as an air curtain, it is possible to suppress rising of warm air from the heating device and to cause the warm air to stay in the vicinity of the lower leg of the driver HM as shown by an arrow S402.

According to the air-conditioning register 100c of the present embodiment, the synchronization portion 670c being the functional member is disposed in the space SP defined between the first retainer ventilation passage 612c and the second retainer ventilation passage 614c. Accordingly, even in the air-conditioning register 100c of the present embodiment, the function part that can vary the function of the air-conditioning register 100c is disposed in the space SP defined between the plurality of flow passages and hence, it is possible to effectively use the space SP, leading to a reduction in size of the air-conditioning register 100c.

D. Other Embodiments (D1) In the above-mentioned first embodiment, the example has been described in which the lid assembly 60 is changed between the first rotation state and the second rotation state by rotating the lid assembly 60 in the retainer 30, the first rotation state being a state in which the first facing area, in which the first retainer inner wall 302W faces the lid assembly 60, is increased while the first ventilation passage distance T1 is maintained, and the second facing area, in which the second retainer inner wall 304W faces the lid assembly 60, is reduced while the second ventilation passage distance T2 is maintained, the second rotation state being a state in which the first facing area is reduced while the first ventilation passage distance T1 is maintained, and the second facing area is increased while the second ventilation passage distance T2 is maintained. In contrast, a configuration may be adopted in which the flow rate at the first air outlet 101 and the flow rate at the second air outlet 102 can be adjusted by sliding the lid assembly 60 upward or downward in the vertical direction, for example, in the retainer 30. For example, by sliding the lid assembly 60 downward in the vertical direction, the lid assembly 60 is disposed at a position closer to the second retainer inner wall 304W than to the first retainer inner wall 302W, thus bringing about a first sliding state in which the first ventilation passage distance between the first retainer inner wall 302W and the lid assembly 60 is increased while the size of the first facing area, in which the first retainer inner wall 302W faces the lid assembly 60, is maintained, but the second ventilation passage distance between the second retainer inner wall 304W and the lid assembly 60 is reduced while the size of the second facing area, in which the second retainer inner wall 304W faces the lid assembly 60, is maintained. Further, by sliding the lid assembly 60 upward in the vertical direction, it is possible to bring about a second sliding state in which the first ventilation passage distance is reduced while the size of the first facing area is maintained, but the second ventilation passage distance is increased while the size of the second facing area is maintained. According to the air-conditioning register 100 of the present embodiment, it is possible to adjust the flow rate of an air flow at the first air outlet 101 and the flow rate of an air flow at the second air outlet 102 by a simple method, that is, by sliding the lid assembly 60.

(D2) In each of the above-mentioned respective embodiments, the example has been described in which the air-conditioning register 100 has two air outlets consisting of the first air outlet 101 and the second air outlet 102. However, the air-conditioning register 100 may have either one of the first air outlet 101 or the second air outlet 102, for example. Even when such a configuration is adopted, it is possible to provide an air-conditioning register 100 with enhanced design properties.

(D3) In the above-mentioned first embodiment, the example has been described in which the lid assembly 60 has a columnar shape. However, the shape of the lid assembly 60 is not limited to a columnar shape, and the lid assembly 60 may be any columnar body, such as a polygonal column, or may be a sphere. In the case in which the lid assembly 60 is a polygonal column, the exposed surface 606 may be formed by any one of flat surfaces of the polygonal column, or may be formed by two or more flat surfaces including a corner portion.

(D4) In each of the above-mentioned respective embodiments, the example has been described in which the retainer opening portion 306 has a rectangular shape. However, the shape of the retainer opening portion 306 is not limited to a rectangular shape, and may be any of suitable geometric shapes, such as a circular shape, an elliptical shape, or a polygonal shape. Further, in each of the above-mentioned respective embodiments, the example has been described in which the shape of the bezel opening portion 206 is the same as the shape of the retainer opening portion 306. However, the configuration is not limited to the above, and the shape of the bezel opening portion 206 need not be the same as the shape of the retainer opening portion 306. In this case, the shape of the exposed surface 606 may also be set to a suitable shape that corresponds to the retainer opening portion 306.

(D5) In each of the above-mentioned respective embodiments, the description has been made for the example in which the first side 306s1 and the second side 306s2 of the retainer opening portion 306 are disposed in such a way as to extend along the vehicle width direction. However, in the air-conditioning register 100, the first side 306s1 and the second side 306s2 of the retainer opening portion 306 may be disposed in a state of being inclined at any angle including a right angle with respect to the vehicle width direction. For example, the first side 306s1 and the second side 306s2 of the retainer opening portion 306 may be disposed in such a way as to extend in the direction intersecting with the vehicle width direction.

(D6) In each of the above-mentioned respective embodiments, the example has been described in which the first side 306s1 and the second side 306s2 have a straight line shape. However, the shape of the first side 306s1 and the second side 306s2 is not limited to a straight line shape, and may be any of various curved line shapes, such as an arc, or may be any of various shapes, such as a corrugated shape. The same also applies for the first air outlet 101 and the second air outlet 102.

The present disclosure is not limited to the above-described embodiments, and may be achieved by various configurations without departing from the scope of the present disclosure. For example, to solve a part or a whole of the above-described problem or to achieve a part or a whole of the above-described effect, the technical features in the embodiments and their modifications may be suitably replaced or combined with each other. Further, if such a technical feature is not described in this specification as an essential technical feature, such a technical feature may be deleted when appropriate. The present disclosure may be implemented by aspects described below.

(1) According to one embodiment of the present disclosure, an air-conditioning register is provided. This air-conditioning register includes: a retainer including a retainer inner wall and a retainer opening portion, and having a cylindrical shape, the retainer inner wall defining a retainer ventilation passage, the retainer opening portion being provided at a downstream end of the retainer ventilation passage; and a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion.

According to the air-conditioning register of the present embodiment, it is possible to provide an air-conditioning register in which the lid assembly is exposed from the inside of the retainer through the retainer opening portion in order to prevent the internal structure from being easily visually perceived and hence, design properties are enhanced.

(2) In the air-conditioning register of the above-mentioned embodiment, the retainer opening portion may have one side and another side that faces the one side. The retainer facing surface may define a first air outlet and a second air outlet as the air outlet, the first air outlet being defined between the retainer facing surface and the one side of the retainer opening portion, the second air outlet being defined between the retainer facing surface and the other side of the retainer opening portion.

According to the air-conditioning register of the present embodiment, the air outlet is provided at two positions and hence, it is possible to increase the range within which an air flow is blown from the air-conditioning register.

(3) In the air-conditioning register of the above-mentioned embodiment, the first air outlet and the second air outlet may be configured such that a direction of an air flow blown from the first air outlet intersects with a direction of an air flow blown from the second air outlet.

According to the air-conditioning register of the present embodiment, the air flow blown from first air outlet is caused to merge with the air flow blown from second air outlet and hence, it is possible to adjust the flow direction of an air flow blown from the air-conditioning register by a simple method, that is, by adjusting a balance of the flow rate between the air flows.

(4) In the air-conditioning register of the above-mentioned embodiment, the air-conditioning register may further include: a first retainer ventilation passage defined between a first retainer inner wall of the retainer inner wall and the lid assembly, and communicating with the first air outlet, the first retainer inner wall being continuously formed with the one side of the retainer opening portion; a second retainer ventilation passage defined between a second retainer inner wall of the retainer inner wall and the lid assembly, and communicating with the second air outlet, the second retainer inner wall being continuously formed with the other side of the retainer opening portion; and a flow dividing portion disposed in the retainer, and configured to divide the retainer ventilation passage into the first retainer ventilation passage and the second retainer ventilation passage.

According to the air-conditioning register of the present embodiment, it is possible to blow air flows from a plurality of air outlets, that is, from the first air outlet and the second air outlet, without individually providing a source of air-conditioning air for the first retainer ventilation passage and for the second retainer ventilation passage.

(5) In the air-conditioning register of the above-mentioned embodiment, the lid assembly may be configured to be rotatable in the retainer, and the lid assembly may be changeable between a first rotation state and a second rotation state by rotating the lid assembly, the first rotation state being a state in which a first facing area, in which the first retainer inner wall faces the lid assembly, is increased while a first ventilation passage distance between the first retainer inner wall and the lid assembly is maintained, and a second facing area, in which the second retainer inner wall faces the lid assembly, is reduced while a second ventilation passage distance between the second retainer inner wall and the lid assembly is maintained, the second rotation state being a state in which the first facing area is reduced while the first ventilation passage distance is maintained, and the second facing area is increased while the second ventilation passage distance is maintained.

According to the air-conditioning register of the present embodiment, it is possible to adjust the flow rate of an air flow at the first air outlet and the flow rate of an air flow at the second air outlet by a simple method, that is, by rotating the lid assembly.

(6) In the air-conditioning register of the above-mentioned embodiment, the flow dividing portion may be changeable between a first flow division state and a second flow division state, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage.

According to the air-conditioning register of the present embodiment, it is possible to change the direction of an air flow blown from the air-conditioning register by a simple method, that is, by adjusting the flow rate in the flow passage communicating with the first retainer ventilation passage and the flow rate in the flow passage communicating with the second retainer ventilation passage.

(7) In the air-conditioning register of the above-mentioned embodiment, a first distance between the one side of the retainer opening portion and the retainer facing surface at the first air outlet may be larger than a second distance between the other side of the retainer opening portion and the retainer facing surface at the second air outlet. Further, a flange portion may be provided, the flange portion being continuously formed with the one side of the retainer opening portion, and protruding toward an outside of the retainer.

According to the air-conditioning register of the present embodiment, even in the case in which the opening of the first air outlet is increased, the flange portion can prevent the first air outlet from being easily visually perceived from the outside.

(8) In the air-conditioning register of the above-mentioned embodiment, a first distance between the one side of the retainer opening portion and the retainer facing surface at the first air outlet may be equal to a second distance between the other side of the retainer opening portion and the retainer facing surface at the second air outlet.

According to the air-conditioning register of the present embodiment, two air outlets are symmetrical to each other and hence, it is possible to enhance design properties of the air-conditioning register.

(9) In the air-conditioning register of the above-mentioned embodiment, the lid assembly may be configured to be slidable in the retainer, and the lid assembly may be changeable between a first sliding state and a second sliding state by sliding the lid assembly, the first sliding state being a state in which a first ventilation passage distance between the first retainer inner wall and the lid assembly is increased while a size of a first facing area, in which the first retainer inner wall faces the lid assembly, is maintained, and a second ventilation passage distance between the second retainer inner wall and the lid assembly is reduced while a size of a second facing area, in which the second retainer inner wall faces the lid assembly, is maintained, the second sliding state being a state in which the first ventilation passage distance is reduced while the size of the first facing area is maintained, and the second ventilation passage distance is increased while the size of the second facing area is maintained.

According to the air-conditioning register of the present embodiment, it is possible to adjust the flow rate of an air flow at the first air outlet and the flow rate of an air flow at the second air outlet by a simple method, that is, by sliding the lid assembly.

(10) In the air-conditioning register of the above-mentioned embodiment, the air-conditioning register may further include: a first fin provided in the first retainer ventilation passage, and having a flat plate shape, the first fin being configured to be rotatable about a center axis that intersects with the first retainer inner wall; and a second fin provided in the second retainer ventilation passage, and having a flat plate shape, the second fin being configured to be rotatable about a center axis that intersects with the second retainer inner wall.

According to the air-conditioning register of the present embodiment, it is possible to change the flow direction of an air flow at the first air outlet and the flow direction of an air flow at the second air outlet by a simple method, that is, by rotating the first fin and the second fin.

(11) In the air-conditioning register of the above-mentioned embodiment, the exposed surface may be a curved surface that protrudes toward an outside of the air-conditioning register.

According to the air-conditioning register of the present embodiment, the exposed surface is a curved surface and hence, it is possible to enhance design properties of the air-conditioning register.

(12) In the air-conditioning register of the above-mentioned embodiment, a distance between the retainer opening portion and the retainer facing surface at the air outlet may be 1 millimeter or more and 10 millimeters or less.

According to the air-conditioning register of the present embodiment, it is possible to provide an air-conditioning register having a good balance between design properties and the flow rate of air blown from the air-conditioning register.

(13) The air-conditioning register of the above-mentioned embodiment includes: a flow dividing portion disposed in the retainer, and configured to divide the retainer ventilation passage into a first retainer ventilation passage and a second retainer ventilation passage; and a functional member including at least either one of a function part or an operation part, the function part being configured to vary a function of the air-conditioning register, the operation part being provided to operate a device provided to a vehicle on which the air-conditioning register is mounted. At least a portion of the functional member is disposed in a space defined between the first retainer ventilation passage and the second retainer ventilation passage.

According to the air-conditioning register of the present embodiment, at least either one of the function part or the operation part is disposed in the space defined between the first retainer ventilation passage and the second retainer ventilation passage and hence, it is possible to effectively use the space.

(14) In the air-conditioning register of the above-mentioned embodiment, the functional member may include at least one fin as the function part, each of the at least one fin including a first fin provided to adjust a direction of an air flow flowing through the first retainer ventilation passage, a second fin provided to adjust a direction of an air flow flowing through the second retainer ventilation passage, and a fin coupling portion configured to couple the first fin to the second fin. At least a portion of the fin coupling portion may be disposed in the space.

According to the air-conditioning register of the present embodiment, the fin coupling portion is provided between the first retainer ventilation passage and the second retainer ventilation passage and hence, compared with the case in which the fin coupling portion is provided at a position outside the space, it is possible to shorten the length of the fin coupling portion.

(15) In the air-conditioning register of the above-mentioned embodiment, the fin coupling portion may be a shaft body having a rod shape and disposed in the space. The shaft body may be disposed in the space.

According to the air-conditioning register of the present embodiment, the fin coupling portion is a shaft body having a rod shape and hence, compared with the configuration in which the fin coupling portion is a plate-like member, it is possible to reduce the region in which the space is occupied by the fin coupling portion, leading to a further effective use of the space.

(16) In the air-conditioning register of the above-mentioned embodiment, the functional member may include a plurality of fins and a synchronization portion as the function part, each of the plurality of fins including a first fin provided to adjust a direction of an air flow flowing through the first retainer ventilation passage, a second fin provided to adjust a direction of an air flow flowing through the second retainer ventilation passage, and a fin coupling portion configured to couple the first fin to the second fin, the synchronization portion being configured to couple fin coupling portions of the plurality of fins to each other in order to synchronize actions of the plurality of fins. At least a portion of the synchronization portion may be disposed in the space.

According to the air-conditioning register of the present embodiment, the synchronization portion serving as the function part is provided in the space and hence, compared with the case in which the synchronization portion is disposed at a position outside the space, it is possible to effectively use the space.

(17) In the air-conditioning register of the above-mentioned embodiment, the functional member may include an operation panel as the operation part, the operation panel being provided to adjust a temperature of an air flow blown from the air-conditioning register. The operation panel may be disposed in the space.

According to the air-conditioning register of the present embodiment, the operation part is disposed in the space and hence, it is possible to achieve a reduction in size of the air-conditioning register.

(18) In the air-conditioning register of the above-mentioned embodiment, the flow dividing portion may have a center axis including a shaft member. The shaft member may allow the flow dividing portion to rotate about the center axis, thus serving as the function part that allows the flow dividing portion to be changeable between a first flow division state and a second flow division state, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage. The shaft member may be disposed in the space.

According to the air-conditioning register of the present embodiment, it is possible to increase durability of the rotary shaft of the flow dividing portion, and it is also possible to reduce the region in which the space is occupied by the shaft body that allows the flow dividing portion to rotate.

(19) The air-conditioning register of the above-mentioned embodiment may further include a restricting portion configured to restrict movement of the flow dividing portion. The flow dividing portion may be changeable between a first flow division state and a second flow division state by being rotated about a center axis, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage. The restricting portion may be disposed in the space, and may restrict the movement of the flow dividing portion to a range from the first flow division state to the second flow division state.

According to the air-conditioning register of the present embodiment, it is possible to facilitate adjustment of a flow rate from the first flow division state to the second flow division state, the adjustment of a flow rate being performed by the flow dividing portion.

(20) In the air-conditioning register of the above-mentioned embodiment, the flow dividing portion may include a protruding portion protruding toward an upstream side of the retainer ventilation passage, a first inclined surface continuously formed with the protruding portion, and a second inclined surface continuously formed with the protruding portion, and disposed on a side opposite to the first inclined surface. The restricting portion may be covered by the first inclined surface and the second inclined surface.

According to the air-conditioning register of the present embodiment, it is possible to suppress or prevent a situation in which air-conditioning air is guided to the restricting portion.

The present disclosure can be achieved by various embodiments other than the air-conditioning register. For example, the present disclosure can be achieved by an embodiment for a method for manufacturing an air-conditioning register, a mobile body equipped with an air-conditioning register, or an air conditioner.

What is claimed is:

1. An air-conditioning register, comprising:
a retainer including a retainer inner wall and a retainer opening portion, the retainer having a cylindrical shape, the retainer inner wall defining a retainer ventilation passage, the retainer opening portion being provided at a downstream end of the retainer ventilation passage; and
a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion;
wherein
the retainer opening portion has one side and an other side that faces the one side, the retainer facing surface defines a first air outlet and a second air outlet as the air outlet, the first air outlet being defined between the retainer facing surface and the one side of the retainer opening portion, the second air outlet being defined between the retainer facing surface and the other side of the retainer opening portion, the lid assembly is configured to be rotatable in the retainer, and the lid assembly is changeable between a first rotation state and a second rotation state by rotating the lid assembly, the first rotation state being a state in which a first facing area, in which the first retainer inner wall faces the lid assembly, is increased while a first ventilation passage distance between the first retainer inner wall and the lid assembly is maintained, and a second facing area, in which the second retainer inner wall faces the lid assembly, is reduced while a second ventilation passage distance between the second retainer inner wall and the lid assembly is maintained, the second rotation state being a state in which the first facing area is reduced while the first ventilation passage distance is maintained, and the second facing area is increased while the second ventilation passage distance is maintained, further comprising:
a first retainer ventilation passage defined between a first retainer inner wall of the retainer inner wall and the lid assembly, and communicating with the first air outlet, the first retainer inner wall being continuously formed with the one side of the retainer opening portion;
a second retainer ventilation passage defined between a second retainer inner wall of the retainer inner wall and the lid assembly, and communicating with the second air outlet, the second retainer inner wall being continuously formed with the other side of the retainer opening portion; and
a flow dividing portion disposed in the retainer, and configured to divide the retainer ventilation passage into the first retainer ventilation passage and the second retainer ventilation passage.

2. The air-conditioning register according to claim 1, wherein
a first distance between the one side of the retainer opening portion and the retainer facing surface at the first air outlet is equal to a second distance between the other side of the retainer opening portion and the retainer facing surface at the second air outlet.

3. The air-conditioning register according to claim 1, further comprising:
a first fin provided in the first retainer ventilation passage, and having a flat plate shape, the first fin being configured to be rotatable about a center axis that intersects with the first retainer inner wall; and
a second fin provided in the second retainer ventilation passage, and having a flat plate shape, the second fin being configured to be rotatable about a center axis that intersects with the second retainer inner wall.

4. The air-conditioning register according to claim 1, wherein
the exposed surface is a curved surface that protrudes toward an outside of the air-conditioning register.

5. The air-conditioning register according to claim 1, wherein

33 a distance between the retainer opening portion and the retainer facing surface at the air outlet is 1 millimeter or more and 10 millimeters or less.

6. An air-conditioning register, comprising:

a retainer including a retainer inner wall and a retainer opening portion, the retainer having a cylindrical shape, the retainer inner wall defining a retainer ventilation passage, the retainer opening portion being provided at a downstream end of the retainer ventilation passage; and a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion;

wherein the retainer opening portion has one side and an other side that faces the one side, the retainer facing surface defines a first air outlet and a second air outlet as the air outlet, the first air outlet being defined between the retainer facing surface and the one side of the retainer opening portion, the second air outlet being defined between the retainer facing surface and the other side of the retainer opening portion, and further comprising:

a first retainer ventilation passage defined between a first retainer inner wall of the retainer inner wall and the lid assembly, and communicating with the first air outlet, the first retainer inner wall being continuously formed with the one side of the retainer opening portion;

a second retainer ventilation passage defined between a second retainer inner wall of the retainer inner wall and the lid assembly, and communicating with the second air outlet, the second retainer inner wall being continuously formed with the other side of the retainer opening portion; and a flow dividing portion disposed in the retainer, and configured to divide the retainer ventilation passage into the first retainer ventilation passage and the second retainer ventilation passage, wherein the flow dividing portion is changeable between a first flow division state and a second flow division state, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage.

7. The air-conditioning register according to claim 6, wherein a first distance between the one side of the retainer opening portion and the retainer facing surface at the first air outlet is larger than a second distance between the other side of the retainer opening portion and the retainer facing surface at the second air outlet, and

a flange portion is further provided, the flange portion being continuously formed with the one side of the retainer opening portion, and protruding toward an outside of the retainer.

8. An air-conditioning register, comprising:

a retainer including a retainer inner wall and a retainer opening portion, the retainer having a cylindrical shape, the retainer inner wall defining a retainer ventilation passage, the retainer opening portion being provided at a downstream end of the retainer ventilation passage; and a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion;

wherein the retainer opening portion has one side and an other side that faces the one side, the retainer facing surface defines a first air outlet and a second air outlet as the air outlet, the first air outlet being defined between the retainer facing surface and the one side of the retainer opening portion, the second air outlet being defined between the retainer facing surface and the other side of the retainer opening portion, the lid assembly is configured to be slidable in the retainer, and the lid assembly is changeable between a first sliding state and a second sliding state by sliding the lid assembly, the first sliding state being a state in which a first ventilation passage distance between the first retainer inner wall and the lid assembly is increased while a size of a first facing area, in which the first retainer inner wall faces the lid assembly, is maintained, and a second ventilation passage distance between the second retainer inner wall and the lid assembly is reduced while a size of a second facing area, in which the second retainer inner wall faces the lid assembly, is maintained, the second sliding state being a state in which the first ventilation passage distance is reduced while the size of the first facing area is maintained, and the second ventilation passage distance is increased while the size of the second facing area is maintained, further comprising:

a first retainer ventilation passage defined between a first retainer inner wall of the retainer inner wall and the lid assembly, and communicating with the first air outlet, the first retainer inner wall being continuously formed with the one side of the retainer opening portion;

a second retainer ventilation passage defined between a second retainer inner wall of the retainer inner wall and the lid assembly, and communicating with the second air outlet, the second retainer inner wall being continuously formed with the other side of the retainer opening portion; and a flow dividing portion disposed in the retainer, and configured to divide the retainer ventilation passage into the first retainer ventilation passage and the second retainer ventilation passage.

9. An air-conditioning register, comprising:

a retainer including a retainer inner wall and a retainer opening portion, the retainer having a cylindrical shape, the retainer inner wall defining a retainer ventilation passage, the retainer opening portion being provided at a downstream end of the retainer ventilation passage;

a lid assembly provided in the retainer, and having an exposed surface and a retainer facing surface, the exposed surface being exposed from the retainer opening portion, the retainer facing surface facing the retainer opening portion and defining an air outlet between the retainer facing surface and the retainer opening portion;

a flow dividing portion disposed in the retainer, and configured to divide the retainer ventilation passage into a first retainer ventilation passage and a second retainer ventilation passage;

a functional member including at least either one of a function part or an operation part, the function part being configured to vary a function of the air-conditioning register, the operation part being provided to operate a device provided to a vehicle on which the air-conditioning register is mounted; and a front wall portion configured to form the first retainer ventilation passage and the second retainer ventilation passage between the front wall portion and the retainer inner wall, wherein at least a portion of the functional member is disposed in a space defined between the first retainer ventilation passage and the second retainer ventilation passage, and wherein the space is located between a wall portion of the flow dividing portion facing the first retainer ventilation passage and a wall portion of the flow dividing portion facing the second retainer ventilation passage or between a wall portion of the front wall portion facing the first retainer ventilation passage and a wall portion of the front wall portion facing the second retainer ventilation passage.

10. The air-conditioning register according to claim 9, wherein the retainer opening portion has one side and an other side that faces the one side, and the retainer facing surface defines a first air outlet and a second air outlet as the air outlet, the first air outlet being defined between the retainer facing surface and the one side of the retainer opening portion, the second air outlet being defined between the retainer facing surface and the other side of the retainer opening portion.

11. The air-conditioning register according to claim 10, wherein the first air outlet and the second air outlet are configured such that a direction of an air flow blown from the first air outlet intersects with a direction of an air flow blown from the second air outlet.

12. The air-conditioning register according to claim 10, further comprising:

a first retainer ventilation passage defined between a first retainer inner wall of the retainer inner wall and the lid assembly, and communicating with the first air outlet, the first retainer inner wall being continuously formed with the one side of the retainer opening portion;

a second retainer ventilation passage defined between a second retainer inner wall of the retainer inner wall and the lid assembly, and communicating with the second air outlet, the second retainer inner wall being continuously formed with the other side of the retainer opening portion; and a flow dividing portion disposed in the retainer, and configured to divide the retainer ventilation passage into the first retainer ventilation passage and the second retainer ventilation passage.

13. The air-conditioning register according to claim 9, wherein the functional member includes a fin as the function part, the fin including a first fin provided to adjust a direction of an air flow flowing through the first retainer ventilation passage, a second fin provided to adjust a direction of an air flow flowing through the second retainer ventilation passage, and a fin coupling portion configured to couple the first fin to the second fin, and at least a portion of the fin coupling portion is disposed in the space.

14. The air-conditioning register according to claim 13, wherein the fin coupling portion is a shaft body having a rod shape, and the shaft body is disposed in the space.

15. The air-conditioning register according to claim 9, wherein the functional member includes a plurality of fins and a synchronization portion as the function part, each of the plurality of fins including a first fin provided to adjust a direction of an air flow flowing through the first retainer ventilation passage, a second fin provided to adjust a direction of an air flow flowing through the second retainer ventilation passage, and a fin coupling portion configured to couple the first fin to the second fin, the synchronization portion being configured to couple fin coupling portions of the plurality of fins to each other in order to synchronize actions of the plurality of fins, and at least a portion of the synchronization portion is disposed in the space.

16. The air-conditioning register according to claim 9, wherein the functional member includes an operation panel as the operation part, the operation panel being provided to adjust a temperature of an air flow blown from the air-conditioning register, and the operation panel is disposed in the space.

17. The air-conditioning register according to claim 9, wherein the flow dividing portion has a center axis including a shaft member, the shaft member allows the flow dividing portion to rotate about the center axis, thus serving as the function part that allows the flow dividing portion to be changeable between a first flow division state and a second flow division state, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage, and the shaft member is disposed in the space.

18. The air-conditioning register according to claim 9, further comprising a restricting portion configured to restrict movement of the flow dividing portion, wherein the flow dividing portion is changeable between a first flow division state and a second flow division state by being rotated about a center axis, the first flow division state being a state in which a degree of opening of a flow passage communicating with the second retainer ventilation passage is increased by reducing a degree of opening of a flow passage communicating with the first retainer ventilation passage, the second flow division state being a state in which the degree of opening of the flow passage communicating with the second retainer ventilation passage is reduced by increasing the degree of opening of the flow passage communicating with the first retainer ventilation passage, the restricting portion is disposed in the space, and the restricting portion restricts the movement of the flow dividing portion to a range from the first flow division state to the second flow division state.

19. The air-conditioning register according to claim 18, wherein the flow dividing portion includes a protruding portion protruding toward an upstream side of the retainer ventilation passage, a first inclined surface continuously formed with the protruding portion, and a second inclined surface continuously formed with the protruding portion, and disposed on a side opposite to the first inclined surface, and the restricting portion is covered by the first inclined surface and the second inclined surface.

\* \* \* \* \*